US012603971B2

(12) United States Patent (10) Patent No.: US 12,603,971 B2
Krol et al. (45) Date of Patent: \*Apr. 14, 2026

(54) PROVIDING AWARENESS OF WHO CAN HEAR AUDIO IN A VIRTUAL CONFERENCE, AND APPLICATIONS THEREOF

(71) Applicant: Katmai Tech Inc., New York, NY (US)

(72) Inventors: Gerard Cornelis Krol, Leiden (NL);
Erik Stuart Braund, Saugerties, NY (US)

(73) Assignee: Katmai Tech Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,413

(22) Filed: Jul. 5, 2023

(65) Prior Publication Data

US 2023/0353710 A1 Nov. 2, 2023

Related U.S. Application Data

(63) Continuation of application No. 17/313,338, filed on May 6, 2021, now Pat. No. 11,743,430.

(51) Int. Cl.
H04N 7/15 (2006.01)
G06T 15/04 (2011.01)
(Continued)

(52) U.S. Cl.
CPC .............. H04N 7/157 (2013.01); G06T 15/04 (2013.01); G06T 15/20 (2013.01); G10L 25/51 (2013.01)

(58) Field of Classification Search
CPC ......... H04N 7/157; G06T 15/04; G06T 15/20; G10L 25/51
See application file for complete search history.

(56) References Cited

U.S. PATENT DOCUMENTS

| 4,920,565 A | 4/1990 | Strawczynski et al. |
| 5,736,982 A | 4/1998 | Suzuki et al. |
| | (Continued) | |

FOREIGN PATENT DOCUMENTS

| CN | 103580881 A | 2/2014 |
| CN | 105487657 A | 4/2016 |
| | (Continued) | |

OTHER PUBLICATIONS

Kuhm ("Method for visually indicating audio communication strength in 3D environments—The Cone of Silence ED—Darl Kuhm", IP.com, IP.com Inc., West Hemietta, NY, US, Mar. 5, 2008.) (Year: 2008).*

(Continued)

*Primary Examiner* — Xin Sheng
(74) *Attorney, Agent, or Firm* — Sterne, Kessler, Goldstein & Fox P.L.L.C.

(57) ABSTRACT

Disclosed herein is a computer-implemented method, system, device, and computer program product for providing awareness of who are able to hear audio in a virtual conference. For each of the users in the virtual conference, a device of the speaking user or a server determines whether a respective user is able to hear the speaking user based on whether a respective sound volume at which the respective user is able hear the speaking user exceeds a threshold amount. The speaking user's device or the server outputs a notification indicating the users that are able to hear the speaking user.

20 Claims, 17 Drawing Sheets

(51) Int. Cl.
  G06T 15/20 (2011.01)
  G10L 25/51 (2013.01)

(56) References Cited

U.S. PATENT DOCUMENTS

| | | | |
|---|---|---|---|
| 5,880,731 A * | 3/1999 | Liles .................... G06F 3/0481 | |
| | | | 345/473 |
| 6,166,727 A | 12/2000 | Kozuka | |
| 6,215,498 B1 | 4/2001 | Filo et al. | |
| 6,559,863 B1 | 5/2003 | Megiddo | |
| 6,572,475 B1 | 6/2003 | Okabe et al. | |
| 6,583,808 B2 | 6/2003 | Boulanger et al. | |
| 6,853,398 B2 | 2/2005 | Malzbender et al. | |
| 7,006,616 B1 | 2/2006 | Christofferson et al. | |
| 7,197,126 B2 | 3/2007 | Kanada | |
| 7,346,654 B1 | 3/2008 | Weiss | |
| 7,634,073 B2 | 12/2009 | Kanada | |
| 7,840,668 B1 | 11/2010 | Sylvain et al. | |
| 7,855,726 B2 | 12/2010 | Ferren et al. | |
| 8,072,479 B2 | 12/2011 | Valliath et al. | |
| 8,145,998 B2 | 3/2012 | Leahy et al. | |
| 8,191,001 B2 | 5/2012 | Van Wie et al. | |
| 8,279,254 B2 | 10/2012 | Goose et al. | |
| 8,403,751 B2 | 3/2013 | Boustead et al. | |
| 8,430,726 B2 | 4/2013 | Topfer | |
| 8,520,872 B2 | 8/2013 | Jang et al. | |
| 8,620,009 B2 | 12/2013 | Zhang et al. | |
| 8,732,593 B2 | 5/2014 | Van Wie et al. | |
| 8,806,354 B1 | 8/2014 | Hyndman et al. | |
| 8,977,683 B2 | 3/2015 | Rodman et al. | |
| 9,041,764 B2 | 5/2015 | Wang et al. | |
| 9,060,246 B1 | 6/2015 | Fujisaki | |
| 9,218,685 B2 | 12/2015 | Piemonte et al. | |
| 9,241,060 B1 | 1/2016 | Fujisaki | |
| 9,305,319 B2 | 4/2016 | Maor et al. | |
| 9,384,594 B2 | 7/2016 | Maciocci et al. | |
| 9,411,490 B2 | 8/2016 | Van Wie et al. | |
| 9,420,229 B2 | 8/2016 | Pourashraf et al. | |
| 9,565,316 B2 | 2/2017 | Gleim | |
| 9,584,946 B1 | 2/2017 | Lyren et al. | |
| 9,607,428 B2 | 3/2017 | Li | |
| 9,656,168 B1 | 5/2017 | Bear et al. | |
| 9,661,274 B2 | 5/2017 | Kubota et al. | |
| 9,743,044 B2 | 8/2017 | Safaei et al. | |
| 9,910,509 B2 | 3/2018 | Markovic et al. | |
| 10,013,805 B2 | 7/2018 | Barzuza et al. | |
| 10,155,164 B2 | 12/2018 | Boustead et al. | |
| 10,175,846 B1 | 1/2019 | Fujisaki | |
| 10,296,733 B2 | 5/2019 | Roos | |
| 10,304,238 B2 | 5/2019 | Cooper et al. | |
| 10,304,239 B2 | 5/2019 | Gorur Sheshagiri et al. | |
| 10,334,384 B2 | 6/2019 | Sun et al. | |
| 10,356,216 B2 | 7/2019 | Khalid et al. | |
| 10,503,356 B1 | 12/2019 | Fujisaki | |
| 10,542,238 B2 | 1/2020 | Bergmann et al. | |
| 10,573,071 B2 | 2/2020 | Sun et al. | |
| 10,609,334 B2 | 3/2020 | Li | |
| 10,679,411 B2 | 6/2020 | Ziman | |
| 10,834,516 B2 | 11/2020 | Lyren et al. | |
| 10,952,006 B1 | 3/2021 | Krol et al. | |
| 10,979,672 B1 | 4/2021 | Krol et al. | |
| 11,184,362 B1 | 11/2021 | Krol et al. | |
| 11,743,430 B2 | 8/2023 | Krol et al. | |
| 2002/0158873 A1 | 10/2002 | Williamson | |
| 2005/0213729 A1 | 9/2005 | Rodman et al. | |
| 2005/0213737 A1 | 9/2005 | Rodman et al. | |
| 2007/0188595 A1 | 8/2007 | Ferren et al. | |
| 2007/0274528 A1 | 11/2007 | Nakamoto et al. | |
| 2008/0143818 A1 | 6/2008 | Ferren et al. | |
| 2009/0088215 A1 | 4/2009 | Caspi et al. | |
| 2009/0113314 A1 | 4/2009 | Dawson et al. | |
| 2009/0240359 A1 * | 9/2009 | Hyndman ......... H04M 3/42221 | |
| | | | 715/757 |
| 2009/0254843 A1 | 10/2009 | Van Wie et al. | |
| 2010/0169796 A1 | 7/2010 | Lynk et al. | |
| 2010/0246788 A1 | 9/2010 | Menard et al. | |
| 2011/0072367 A1 | 3/2011 | Bauer | |
| 2012/0069131 A1 | 3/2012 | Abelow | |
| 2012/0089117 A1 | 4/2012 | Junginger et al. | |
| 2012/0204119 A1 | 8/2012 | Lefar et al. | |
| 2013/0212228 A1 | 8/2013 | Butler et al. | |
| 2013/0222371 A1 * | 8/2013 | Reitan ................... G06T 19/006 | |
| | | | 345/419 |
| 2013/0227437 A1 | 8/2013 | Brody et al. | |
| 2013/0321564 A1 | 12/2013 | Smith et al. | |
| 2014/0058807 A1 | 2/2014 | Altberg et al. | |
| 2014/0237393 A1 | 8/2014 | Van Wie et al. | |
| 2015/0121506 A1 | 4/2015 | Cavanaugh | |
| 2015/0302661 A1 | 10/2015 | Miller | |
| 2016/0134840 A1 | 5/2016 | McCulloch | |
| 2016/0342303 A1 | 11/2016 | Van Wie et al. | |
| 2017/0103440 A1 | 4/2017 | Xing et al. | |
| 2017/0351476 A1 | 12/2017 | Yoakum | |
| 2017/0359666 A1 | 12/2017 | Lyren et al. | |
| 2019/0098255 A1 | 3/2019 | Bergmann et al. | |
| 2019/0199993 A1 | 6/2019 | Babu J D et al. | |
| 2019/0250879 A1 | 8/2019 | Blume et al. | |
| 2019/0310761 A1 | 10/2019 | Agarawala et al. | |
| 2019/0320144 A1 | 10/2019 | Tong et al. | |
| 2019/0354170 A1 | 11/2019 | Rosedale | |
| 2019/0371060 A1 | 12/2019 | Energin et al. | |
| 2020/0008003 A1 | 1/2020 | Thompson et al. | |
| 2020/0037091 A1 | 1/2020 | Jeon et al. | |
| 2020/0098191 A1 | 3/2020 | McCall | |
| 2020/0221247 A1 | 7/2020 | Latypov et al. | |
| 2020/0279567 A1 | 9/2020 | Adlersberg | |
| 2020/0322575 A1 | 10/2020 | Valli | |
| 2020/0329214 A1 | 10/2020 | Ahn et al. | |
| 2020/0368616 A1 | 11/2020 | DeLamont | |
| 2021/0089117 A1 | 3/2021 | Bodolee et al. | |
| 2021/0193168 A1 | 6/2021 | Taki et al. | |
| 2022/0360742 A1 | 11/2022 | Krol et al. | |

FOREIGN PATENT DOCUMENTS

| | | |
|---|---|---|
| CN | 103888714 B | 4/2017 |
| CN | 106648528 A | 5/2017 |
| CN | 108319439 A | 7/2018 |
| CN | 106528038 B | 9/2019 |
| EP | 3282669 B1 | 1/2020 |
| EP | 3627860 A1 | 3/2020 |
| EP | 3684083 A1 | 7/2020 |
| GB | 2351216 B | 12/2002 |
| JP | H07288791 A | 10/1995 |
| JP | 2003006132 A | 1/2003 |
| JP | 4426484 B2 | 3/2010 |
| KR | 20200028871 A | 3/2020 |
| WO | WO 2008125593 A2 | 10/2008 |
| WO | WO 2008141596 A1 | 11/2008 |
| WO | WO 2010083119 A2 | 7/2010 |
| WO | WO 2010143359 A1 | 12/2010 |
| WO | WO 2018005235 A1 | 1/2018 |
| WO | WO 2019008320 A1 | 1/2019 |
| WO | WO 2019046597 A1 | 3/2019 |
| WO | WO 2020041652 A1 | 2/2020 |

OTHER PUBLICATIONS

Dipaola, S. and Collins, D., "A 3D Virtual Environment for Social Telepresence", Mar. 2002; 6 pages.

Engage VR, "Next Generation Education, Training, Meetings & Events," accessed at https://engagevr.io/, accessed on Oct. 28, 2020; 6 pages.

Event Farm, "Bring Your Events Into the Virtual World," accessed at https://eventfarm.com/the-echo, accessed on Oct. 28, 2020; 6 pages.

Hongtongsak, K., "Accurately Pinpointing 3D Sound in Virtual Environments," Jun. 2016, 31 pages.

Johansson, N., "The 10 Best VR Meeting Apps—Productive Remote Collaboration," accessed at https://immersive.ly/best-vr-apps-productive-remote-meetings/, accessed on Oct. 28, 2020; 10 pages.

(56) References Cited

OTHER PUBLICATIONS

Leung, W. and Chen, T., "Networked Collaborative Environment With Animated 3D Avatars, Dept. of Electrical and Computer Engineering Carnegie Mellon University," Aug. 6, 2002; 3 pages.
Leung, W. et al.., "Networked Intelligent Collaborative Environment (NetICE), Multimedia and Expo 2000," Aug. 6, 2002; 4 pages.
Leung, W. and Chen, T., "A Multi-User 3-D Virtual Environment With Interactive Collaboration and Shared Whiteboard Technologies, Kluwer Academic Publishers," Jul. 23, 2003, 17 pages.
Lin, J. et al., "A Virtual Reality Platform for Dynamic Human-Scene Interaction," Dec. 2016; 4 pages.
Nishihara, R. and Okubo, M., "A Study on Personal Space in Virtual Space Based on Personality," 2015; 8 pages.
Sandre, A., "Is Virtual Reality the Future of Video Conferencing?" May 15, 2020; 7 pages.
De Sousa, A., "Remote Proxemics for Collaborative Virtual Environments," Nov. 2014; 10 pages.
Takahashi, D., "MeetinVR launches online VR meetings with 'superpowers'," venturebeat.com, accessed at https://venturebeat.com/2020/05/27/meetinvr-launches-online-vr-meetings-with-superpowers, published May 27, 2020; 7 pages.
Teooh, "Virtual Spaces for Real Communities," accessed at https://teooh.com/, accessed on Oct. 28, 2020; 3 pages.
VirBELA Media, "Team Suites," accessed at https://www.virbela.com/teamsuites, accessed on Oct. 1, 2020; 26 pages.
Virtway Events, "Your 3D Space for Events," accessed at https://www.virtwayevents.com/, accessed on Oct. 28, 2020; 5 pages.
SaganWorks, "The World's First 3D Virtual Classroom," accessed at https://www.youtube.com/watch?v=DTmRfV-3vwc, YouTube video published on Jun. 26, 2020; 5 minutes 53 seconds (submitted on accompanying CD-ROM).
Spatial, "Collaborate from Anywhere in AR," accessed at https://www.youtube.com/watch?v=PG3tQYIZ6JQ, video published on Oct. 24, 2018; 2 minutes 15 seconds (submitted on accompanying CD-ROM).
Spatial—Virtual Reality Offices, "Faster, Better, More Productive Than a Video Conference—You Can Do Work Together in VR!", accessed at https://www.youtube.com/watch?v=QtHsf-XxzrI, video published on Apr. 27, 2018; 5 minutes 9 seconds (submitted on accompanying CD-ROM).
Hideyuki Nakanishi et al., "FreeWalk", Proceedings of the 1996 ACM Conference on Computer Supported Cooperative Work; [022386], AMC, New York, Ny, US, Nov. 16, 1996; pp. 308-314.
Hideyuki Nakanishi et al., "FreeWalk/Q", 11th Proceedings of the ACM Symposium on Virtual Reality Software and Technology, VRST 2004, Nov. 10- 12, 2004; Hong Kong, China, ACM, 2 Penn Plaza, Suite 701, New York, NY 10121-0701 USA, Nov. 10, 2004; pp. 97-104.
Hideyuki Nakanishi et al., "FreeWalk: a social interation platform for group behavior in a virtual space", International Journal of Huam-Computer Studies, vol. 60, No. 4, Apr. 1, 2004; pp. 421-454.
"Method for visually indicating audio communication strength in 3D environments—The Cone of Silence ED—Darl Kuhm", IP.com, IP.com Inc., West Henrietta, NY, US, Mar. 5, 2008.
International Search Report and Written Opinion for International Application No. PCT/US2022/027848, European Patent Office, Netherlands, mailed on Aug. 2, 2022, 16 pages.

* cited by examiner

PROVIDING AWARENESS OF WHO CAN HEAR AUDIO IN A VIRTUAL CONFERENCE, AND APPLICATIONS THEREOF

CROSS REFERENCE TO RELATED APPLICATION

This application is a continuation of U.S. patent application Ser. No. 17/313,338, filed on May 6, 2021 (now pending), which is incorporated by reference herein in its entirety.

BACKGROUND

Field

This field is generally related to videoconferencing.

Related Art

Video conferencing involves the reception and transmission of audio-video signals by users at different locations for communication between people in real time. Videoconferencing is widely available on many computing devices from a variety of different services, including the ZOOM service available from Zoom Communications Inc. of San Jose, CA. Some videoconferencing software, such as the FaceTime application available from Apple Inc. of Cupertino, CA, comes standard with mobile devices.

In general, these applications operate by displaying video and outputting audio of other conference participants. When there are multiple participants, the screen may be divided into a number of rectangular frames, each displaying video of a participant. Sometimes these services operate by having a larger frame that presents video of the person speaking. As different individuals speak, that frame will switch between speakers. The application captures video from a camera integrated with the user's device and audio from a microphone integrated with the user's device. The application then transmits that audio and video to other applications running on other users' devices.

Recently, videoconferencing technology has gained importance. Many workplaces, trade shows, meetings, conferences, schools, and places of worship have closed or encouraged people not to attend for fear of spreading disease, in particular COVID-19. Virtual conferences using videoconferencing technology are increasingly replacing physical conferences. In addition, this technology provides advantages over physically meeting to avoid travel and commuting.

Often, use of this videoconferencing technology causes loss of a sense of place. There is an experiential aspect to meeting in person physically, being in the same place, that is lost when conferences are conducted virtually. Specifically, there is a social aspect to being able to posture oneself and look at ones peers. This experiential aspect is important in creating relationships and social connections. Yet, this feeling is lacking when it comes to conventional videoconferences.

When a videoconference starts to involve several participants, additional problems occur with these videoconferencing technologies. During physical conferences, people can have side conversations. One can project and moderate their voice so that only people close to them can hear what they are saying. In some cases, one can even have private conversations in the context of a larger meeting. However, with virtual conferences, when multiple people are speaking at the same time, the software mixes the two audio streams substantially equally, causing participants to speak over one another. Consequently, when multiple people are involved in a virtual conference, private conversations are impossible, and the dialogue tends to be more in the form of speeches from one to many. Here, too, virtual conferences do not provide an opportunity for participants to create social connections and to communicate and network effectively.

Massively multiplayer online games (MMOG or MMO) provide an alternative way for users to interact virtually. MMOs often allow players to navigate avatars around a virtual world. Sometimes these MMOs allow users to speak with one another or send messages to one another. Examples include the ROBLOX game available from Roblox Corporation of San Mateo, CA, and the MINECRAFT game available from Mojang Studios of Stockholm, Sweden.

Having bare avatars interact with one another also has limitations in terms of social interaction. These avatars usually cannot communicate facial expressions, which people often make inadvertently. These facial expressions are observable on videoconference. Some publications may describe having video placed on an avatar in a virtual world. However, these systems typically require specialized software and have other limitations that limit their usefulness.

Virtual conferencing in a three-dimensional environment can introduce privacy issues. In a real-world situation, speakers can sense the people who can hear them. Speakers use peripheral vision, sound cues (e.g., footsteps), nonverbal cues, and even expressions and responses from others to sense when a person may be approaching her from behind. However, when multiple people are involved in a virtual conference, it may be difficult for a speaker to determine whether other meeting participants can hear them. Further, a speaker's vantage point may be bound by the virtual camera and thus the speaker may not be able to sense the presence of users that are outside the view point of the virtual camera. This is because virtual conferencing also often lacks nonverbal cues, peripheral vision, and sound cues. This may enable other users to secretly listen in on conversations.

Moreover, existing video conference systems may broadcast a speaker's audio stream to devices of all participants of a virtual conference. The client devices decide which of the received audio streams to mix together and to ultimately output to the participant. This approach may have a security vulnerability. If a hacker, for example, were able to intercept the audio stream or spoof the client application, then the hacker may be able to access audio streams that the hacker could not have otherwise heard. Also, transmitting audio streams to a client that are never actually used may result in wasted bandwidth.

Improved methods are needed for videoconferencing.

BRIEF SUMMARY

In an embodiment, a computer-implemented method, system, device, and computer program product provide for securing private audio in a virtual conference. A device of a speaking user receives an audio stream captured from a microphone of the speaking user's device. The microphone is positioned to capture speech of the speaking user. The speaking user's device or a server in communication with the speaking user's device renders a three-dimensional virtual space from a perspective of a speaker user's virtual camera for the speaker user. The three-dimensional virtual space includes a plurality of avatars. Each user of a plurality of users is represented by a respective avatar of the plurality of avatars. For each user of the plurality of users, the speaking user's device or the server determines a respective sound volume based on a respective position in the three-dimensional virtual space of the user's respective avatar relative to a position of the virtual camera in the three-dimensional virtual space. For each of the users, the speaking user's device or the server determines whether the user can hear the speaking user based on whether the respective sound volume exceeds a threshold amount. The speaking user's device or the server outputs a visual notification for display to the speaking user. The visual notification indicates the users that are able to hear the speaking user. This way the speaking user is aware of which users are able to hear the speaking user in the virtual conference.

Further embodiments, features, and advantages of the invention, as well as the structure and operation of the various embodiments, are described in detail below with reference to accompanying drawings.

BRIEF DESCRIPTION OF THE DRAWINGS

The accompanying drawings, which are incorporated herein and form part of the specification, illustrate the present disclosure and, together with the description, further serve to explain the principles of the disclosure and to enable a person skilled in the relevant art to make and use the disclosure.

FIGS. 9A-C are diagrams illustrating traversing a hierarchy of volume areas in a virtual environment during a videoconference.

FIG. 13 is a diagram illustrating components of devices used to provide videoconferencing within a virtual environment.

The drawing in which an element first appears is typically indicated by the leftmost digit or digits in the corresponding reference number. In the drawings, like reference numbers may indicate identical or functionally similar elements.

DETAILED DESCRIPTION

Video Conference with Avatars in a Virtual Environment

Figure 1:
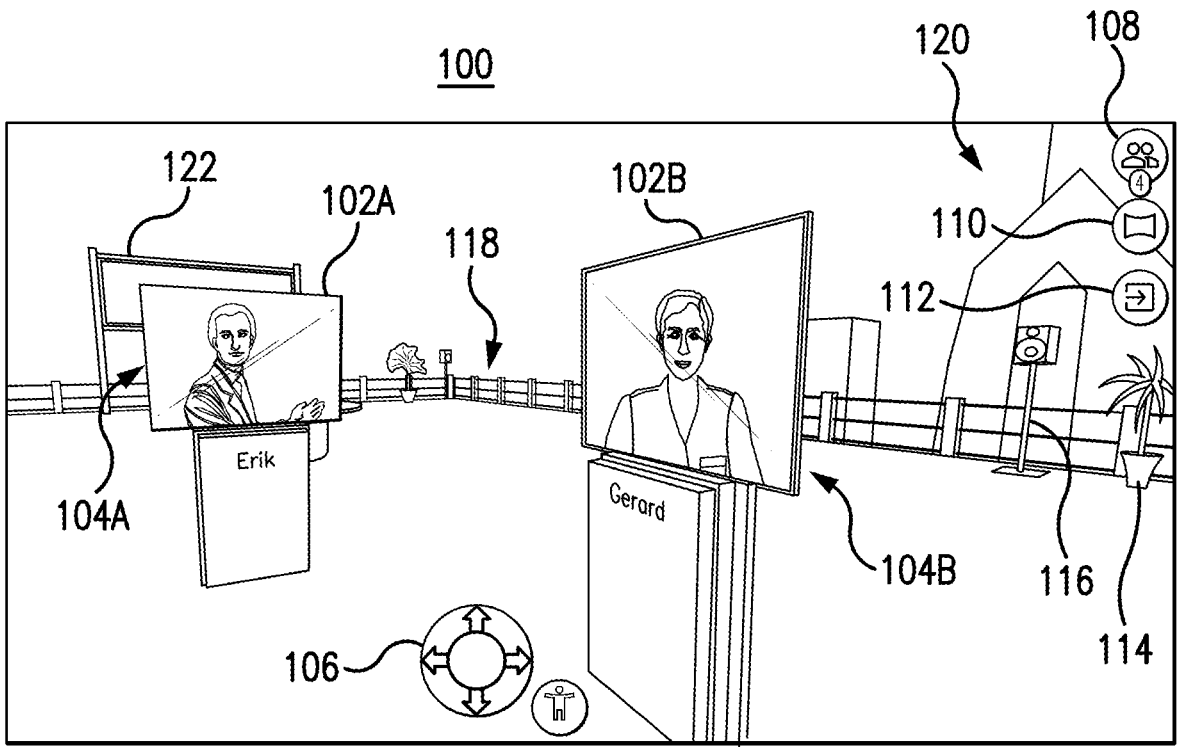
FIG. 1 is a diagram illustrating an example interface that provides videoconferencing in a virtual environment with video streams being mapped onto avatars.

FIG. 1 illustrates an example of an interface 100 that provides videoconferences in a virtual environment with video streams being mapped onto avatars.

Interface 100 may be displayed to a participant of a videoconference. For example, interface 100 may be rendered for display to the participant and may be constantly updated as the videoconference progresses. A user may control the orientation of their virtual camera using, for example, keyboard inputs. In this way, the user can navigate around a virtual environment. In an embodiment, different inputs may change the virtual camera's X and Y position and pan and tilt angles in the virtual environment. In further embodiments, a user may use inputs to alter height (the Z coordinate) or yaw of the virtual camera. In still further embodiments, a user may enter inputs to cause the virtual camera to "hop" up while returning to its original position, simulating jumping. The inputs available to navigate the virtual camera may include, for example, keyboard and mouse inputs, such as WASD keyboard keys to move the virtual camera forward, backward, left, or right on an X-Y plane, a space bar key to "hop" the virtual camera, and mouse movements specifying changes in pan and tilt angles.

Interface 100 includes avatars 102A and 102B, which each represent different participants to the videoconference. Avatars 102A and 102B, respectively, have texture mapped video streams 104A and 104B from devices of the first and second participant. A texture map is an image applied (mapped) to the surface of a shape or polygon. Here, the images are respective frames of video captured from a camera device. The camera devices capturing video streams 104A and 104B are positioned to capture faces of the respective participants. In this way, the avatars have texture mapped thereon, moving images of faces as participants in the meeting talk and listen.

Similar to how the virtual camera is controlled by the user viewing interface 100, the location and direction of avatars 102A and 102B are controlled by the respective participants that they represent. Avatars 102A and 102B are three-dimensional models represented by a mesh. Each avatar 102A and 102B may have the participant's name underneath the avatar.

Avatars 102A and 102B are controlled by respective users. They each may be positioned at a point corresponding to where their own virtual cameras are located within the virtual environment. Just as the user viewing interface 100 can move around the virtual camera, the various users can move around their respective avatars 102A and 102B.

The virtual environment rendered in interface 100 includes background image 120 and a three-dimensional model 118 of an arena. The arena may be a venue or building in which the videoconference should take place. The arena may include a floor area bounded by walls. Three-dimensional model 118 can include a mesh and texture. Other ways to mathematically represent the surface of three-dimensional model 118 may be possible as well. For example, polygon modeling, curve modeling, and digital sculpting may be possible. For example, three-dimensional model 118 may be represented by voxels, splines, geometric primitives, polygons, or any other possible representation in three-dimensional space. Three-dimensional model 118 may also include specification of light sources. The light sources can include for example, point, directional, spotlight, and ambient. The objects may also have certain properties describing how they reflect light. In examples, the properties may include diffuse, ambient, and spectral lighting interactions.

In addition to the arena, the virtual environment can include various other three-dimensional models that illustrate different components of the environment. For example, the three-dimensional environment can include a decorative model 114, a speaker model 116, and a presentation screen model 122. Just as model 118, these models can be represented using any mathematical way to represent a geometric surface in three-dimensional space. These models may be separate from model 118 or combined into a single representation of the virtual environment.

Decorative models, such as model 114, serve to enhance the realism and increase the aesthetic appeal of the arena. Speaker model 116 may virtually emit sound, such as presentation and background music, as will be described in greater detail below with respect to FIGS. 5 and 7. Presentation screen model 122 can serve to provide an outlet to present a presentation. Video of the presenter or a presentation screen share may be texture mapped onto presentation screen model 122.

Button 108 may provide the user a list of participants. In one example, after a user selects button 108, the user could chat with other participants by sending text messages, individually or as a group.

Button 110 may enable a user to change attributes of the virtual camera used to render interface 100. For example, the virtual camera may have a field of view specifying the angle at which the data is rendered for display. Modeling data within the camera field of view is rendered, while modeling data outside the camera's field of view may not be. By default, the virtual camera's field of view may be set somewhere between 60 and 110°, which is commensurate with a wide-angle lens and human vision. However, selecting button 110 may cause the virtual camera to increase the field of view to exceed 170°, commensurate with a fisheye lens. This may enable a user to have broader peripheral awareness of his surroundings in the virtual environment.

Finally, button 112 causes the user to exit the virtual environment. Selecting button 112 may cause a notification to be sent to devices belonging to the other participants, signaling to their devices to stop displaying the avatar corresponding to the user previously viewing interface 100.

In this way, interface 100 of the virtual three-dimensional space is used to conduct video conferencing. Every user controls an avatar, which they can control to move around, look around, jump or do other things which change the position or orientation. A virtual camera shows the user the virtual three-dimensional environment and the other avatars. The avatars of the other users have as an integral part a virtual display, which shows the webcam image of the user.

By giving users a sense of space and allowing users to see each other's faces, various embodiments described herein provide a more social experience than conventional web conferencing or conventional MMO gaming. That more social experience has a variety of applications. For example, it can be used in online shopping. For example, interface 100 has applications in implementing virtual grocery stores, houses of worship, trade shows, B2B sales, B2C sales, schooling, restaurants or lunchrooms, product releases, construction site visits (e.g., for architects, engineers, contractors), office spaces (e.g., people work "at their desks" virtually), remote control of vehicles and machinery (ships, planes, submarines, drones, drilling equipment, etc.), plant/ factory control rooms, medical procedures, garden designs, virtual bus tours with guide, music events (e.g., concerts), lectures (e.g., TED talks), meetings of political parties, board meetings, underwater research, research on hard to reach places, training for emergencies (e.g., fire), cooking, shopping (with checkout and delivery), virtual arts and crafts (e.g., painting and pottery), marriages, funerals, baptisms, remote sports training, counseling, treating fears (e.g., confrontation therapy), fashion shows, amusement parks, home decoration, watching of sports and esports, watching of performances captured using a three-dimensional camera, playing of board and role playing games, walking over/through medical imagery, viewing of geological data, learning of languages, meeting in a space for the visually or hearing impaired, participation in events by people who normally are not ambulatory, presenting of the news or weather, talk shows, book signings, voting, MMOs, buying/selling virtual locations (such as those available in some MMOs like the SECOND LIFE game available from Linden Research, Inc. of San Francisco, CA), flea markets, garage sales, travel agencies, banks, archives, computer process management, fencing/swordfighting/martial arts, reenactments (e.g., reenacting a crime scene and or accident), rehearsing a real event (e.g., a wedding, presentation, show, space-walk), evaluating or viewing a real event captured with three-dimensional cameras, livestock shows, zoos, experiencing life as a tall/short/blind/deaf/white/black person (e.g., a modified video stream or still image for the virtual world to simulate the perspective for which a user wishes to experience reactions), job interviews, game shows, interactive fiction (e.g., murder mystery), virtual fishing, virtual sailing, psychological research, behavioral analysis, virtual sports (e.g., climbing/bouldering), controlling lights and other devices in ones house or other location (domotics), memory palace, archaeology, gift shop, virtual visit so customers will be more comfortable on their real visit, virtual medical procedures to explain the procedures and have people feel more comfortable, and virtual trading floor/financial marketplace/stock market (e.g., integrating real-time data and video feeds into the virtual world, real-time transactions and analytics), virtual location people have to go to as part of their work so they will actually meet each other organically (e.g., if one wants to create an invoice, it is only possible from within the virtual location) and augmented reality where you project the face of the person on top of their AR headset (or helmet) so you can see their facial expressions (e.g., useful for military, law enforcement, firefighters, special ops), and making reservations (e.g., for a certain holiday home/car/etc.)

Figure 2:
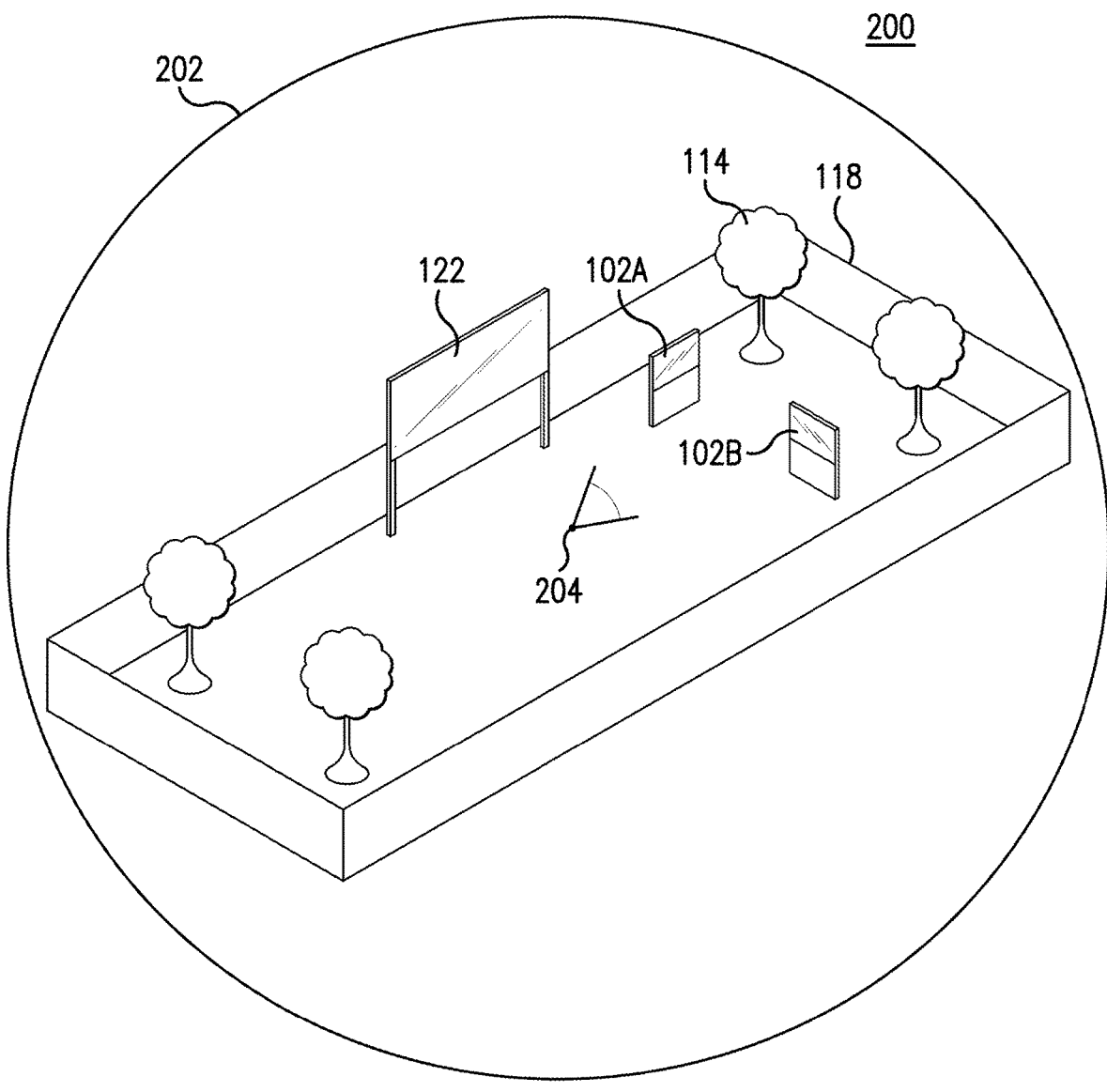
FIG. 2 is a diagram illustrating a three-dimensional model used to render a virtual environment with avatars for videoconferencing.

FIG. 2 illustrates a three-dimensional model 200 used to render a virtual environment, such as the virtual environment described in FIG. 1, with avatars for videoconferencing. Just as illustrated in FIG. 1, the virtual environment here includes a three-dimensional arena 118, and various three-dimensional models, including three-dimensional models 114 and 122. Also as illustrated in FIG. 1, diagram 200 includes avatars 102A and 102B navigating around the virtual environment.

As described above, interface 100 in FIG. 1 is rendered from the perspective of a virtual camera. That virtual camera is illustrated in diagram 200 as virtual camera 204. As mentioned above, the user viewing interface 100 in FIG. 1 can control virtual camera 204 and navigate the virtual camera in three-dimensional space. Interface 100 is constantly being updated according to the new position of virtual camera 204 and any changes of the models within the field of view of virtual camera 204. As described above, the field of view of virtual camera 204 may be a frustum defined, at least in part, by horizontal and vertical field of view angles.

As described above with respect to FIG. 1, a background image, or texture, may define at least part of the virtual environment. The background image may capture aspects of the virtual environment that are meant to appear at a distance. The background image may be texture mapped onto a sphere 202. The virtual camera 204 may be at an origin of the sphere 202. In this way, distant features of the virtual environment may be efficiently rendered.

In other embodiments, other shapes instead of sphere 202 may be used to texture map the background image. In various alternative embodiments, the shape may be a cylinder, cube, rectangular prism, or any other three-dimensional shape.

Figure 3:
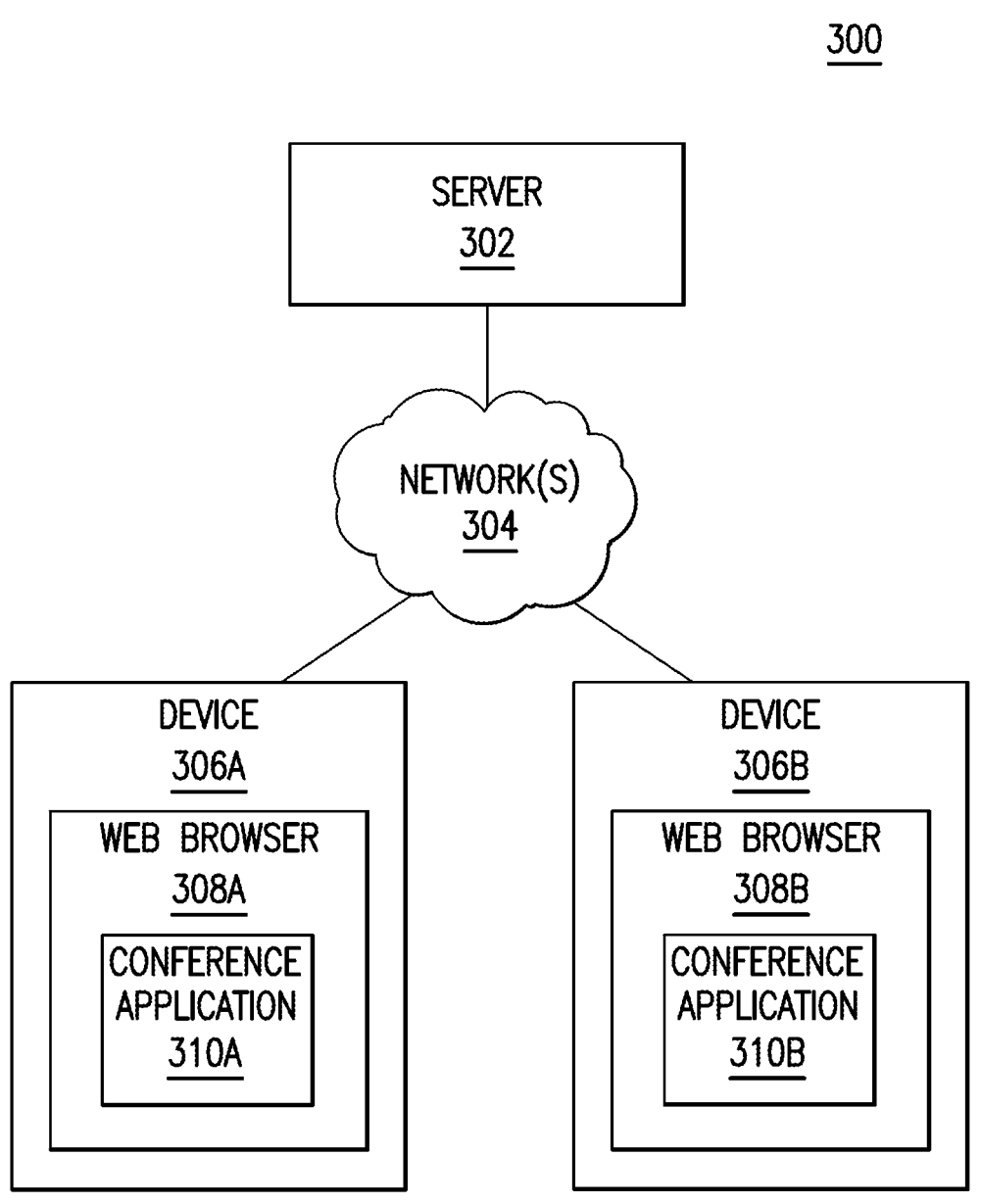
FIG. 3 is a diagram illustrating a system that provides videoconferences in a virtual environment.

FIG. 3 illustrates a system 300 that provides videoconferences in a virtual environment such as the virtual environment of FIG. 1. System 300 includes a server 302 coupled to devices 306A and 306B via one or more networks 304.

Server 302 provides the services to connect a videoconference session between devices 306A and 306B. As will be described in greater detail below, server 302 communicates notifications to devices of conference participants (e.g., devices 306A and 306B) when new participants join the conference and when existing participants leave the conference. Server 302 communicates messages describing a position and direction in a three-dimensional virtual space for respective participant's virtual cameras within the three-dimensional virtual space. Server 302 also communicates video and audio streams between the respective devices of the participants (e.g., devices 306A and 306B). Finally, server 302 stores and transmits data describing data specifying a three-dimensional virtual space to the respective devices 306A and 306B.

In addition to providing data necessary for the virtual conference, server 302 may provide executable information that instructs the devices 306A and 306B on how to render the data to provide the interactive conference.

Server 302 responds to requests with a response. Server 302 may be a web server. A web server is software and hardware that uses HTTP (Hypertext Transfer Protocol) and other protocols to respond to client requests made over the World Wide Web. The main job of a web server is to display website content through storing, processing and delivering webpages to users.

In an alternative embodiment, communication between devices 306A and 306B happens not through server 302 but on a peer-to-peer basis. In that embodiment, one or more of the data describing the respective participants' location and direction, the notifications regarding new and exiting participants, and the video and audio streams of the respective participants are communicated not through server 302 but directly between devices 306A and 306B.

Network 304 enables communication between the various devices 306A and 306B and server 302. Network 304 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or any combination of two or more such networks.

Devices 306A and 306B are each devices of respective participants to the virtual conference. Devices 306A and 306B each receive data necessary to conduct the virtual conference and render the data necessary to provide the virtual conference. As will be described in greater detail below, devices 306A and 306B include a display to present the rendered conference information, inputs that allow the user to control the virtual camera, a speaker (such as a headset) to provide audio to the user for the conference, a microphone to capture a user's voice input, and a camera positioned to capture video of the user's face.

Devices 306A and 306B can be any type of computing device, including a laptop, a desktop, a smartphone, a tablet computer, or a wearable computer (such as a smartwatch or an augmented reality or virtual reality headset).

Web browser 308A and 308B can retrieve a network resource (such as a webpage) addressed by the link identifier (such as a uniform resource locator, or URL) and present the network resource for display. In particular, web browser 308A and 308B is a software application for accessing information on the World Wide Web. Usually, web browser 308A and 308B makes this request using the hypertext transfer protocol (HTTP or HTTPS). When a user requests a web page from a particular website, the web browser retrieves the necessary content from a web server, interprets and executes the content, and then displays the page on a display on device 306A and 306B shown as client/counterpart conference application 308A and 308B. For example, the content may include HTML and client-side scripting, such as JavaScript. Once displayed, a user can input information and make selections on the page, which can cause web browser 308A and 308B to make further requests.

Conference application 310A and 310B may be a web application downloaded from server 302 and configured to be executed by the respective web browsers 308A and 308B. In an embodiment, conference application 310A and 310B may be a JavaScript application. In one example, conference application 310A and 310B may be written in a higher-level language, such as a Typescript language, and translated or compiled into JavaScript. Conference application 310A and 310B is configured to interact with the WebGL JavaScript application programming interface (API). It may have control code specified in JavaScript and shader code written in OpenGL ES Shading Language (GLSL ES). Using the WebGL API, conference application 310A and 310B may be able to utilize a graphics processing unit (not shown) of device 306A and B. Moreover, conference application 310A and 310B may be able to utilize OpenGL rendering of interactive two-dimensional and three-dimensional graphics without the use of plug-ins.

Conference application 310A and 310B receives the data from server 302 describing position and direction of other avatars and three-dimensional modeling information describing the virtual environment. In addition, conference application 310A and 310B receives video and audio streams of other conference participants from server 302.

Conference application 310A and 310B renders three-dimensional modeling data, including data describing the three-dimensional environment and data representing the respective participant avatars. This rendering may involve rasterization, texture mapping, ray tracing, shading, or other rendering techniques. In an embodiment, the rendering may involve ray tracing based on the characteristics of the virtual camera. Ray tracing involves generating an image by tracing a path of light as pixels in an image plane and simulating the effects of the user's encounters with virtual objects. In some embodiments, to enhance realism, the ray tracing may simulate optical effects such as reflection, refraction, scattering, and dispersion.

In this way, the user uses web browser 308A and 308B to enter a virtual space. The scene is displayed on the screen of the user. The webcam video stream and microphone audio stream of the user are sent to server 302. When other users enter the virtual space an avatar model is created for them. The position of this avatar is sent to the server and received by the other users. Other users also get a notification from server 302 that an audio/video stream is available. The video stream of a user is placed on the avatar that was created for that user. The audio stream is played back as coming from the position of the avatar.

Figure 4A:
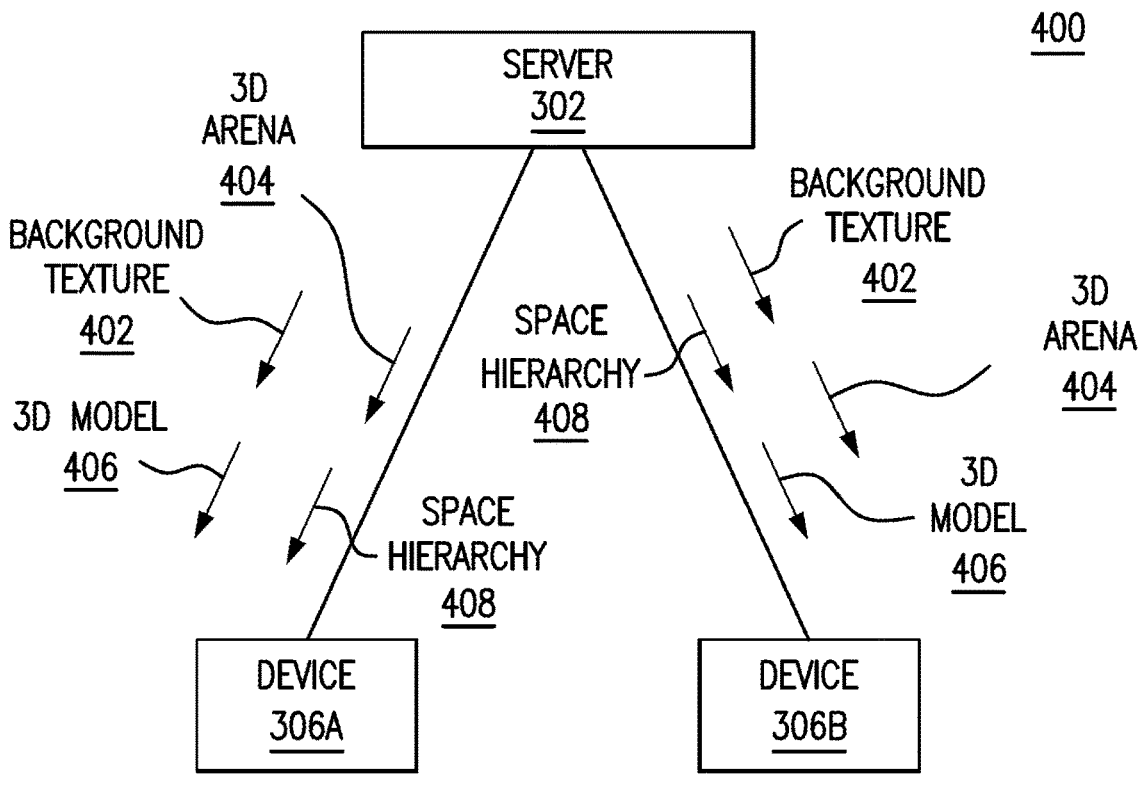
FIGS. 4A-D are diagrams illustrating how data is transferred between various components of the system in FIG. 3 to provide videoconferencing.
Figure 4B:
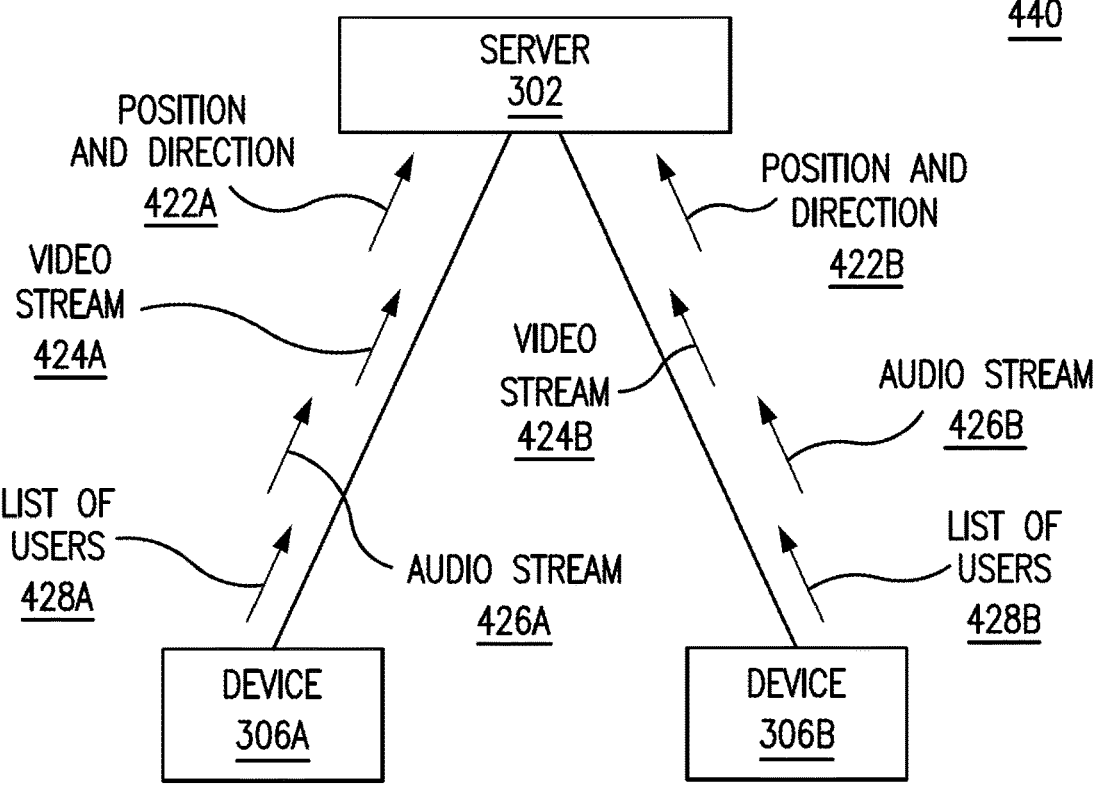
Figure 4C:
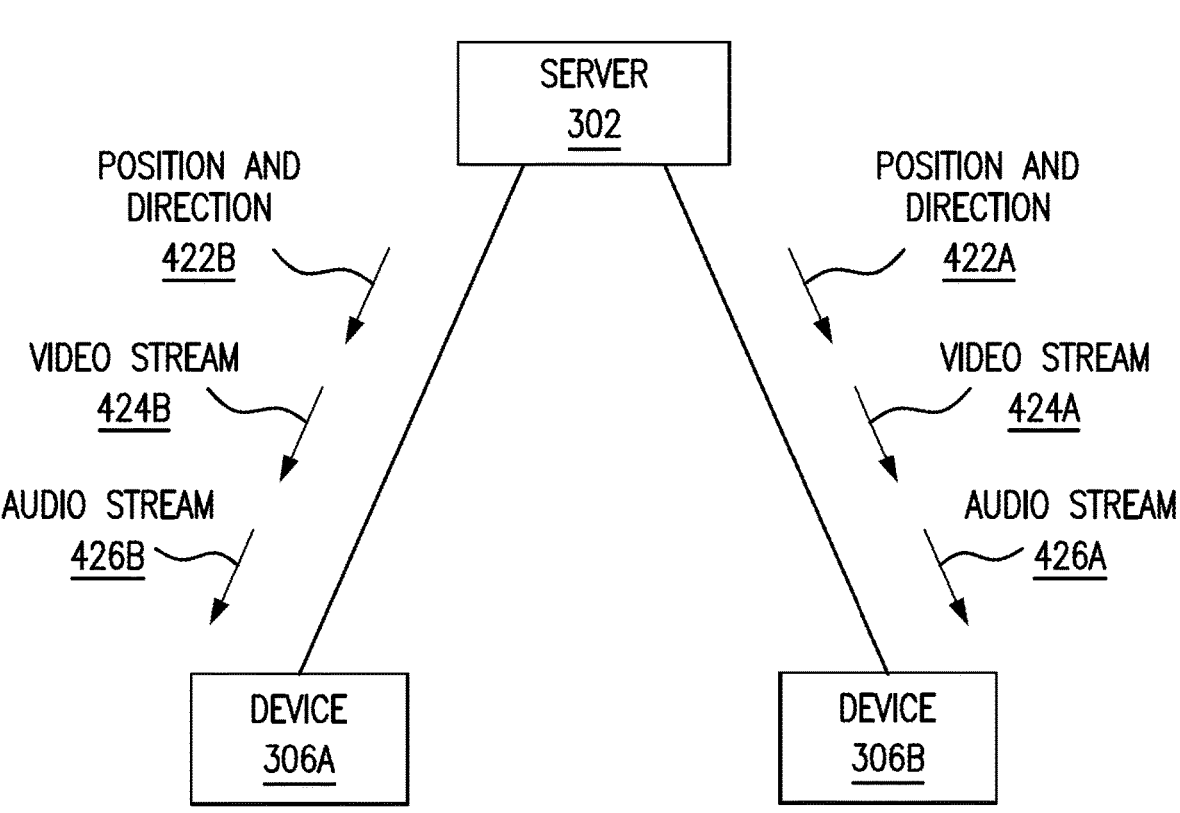

FIGS. 4A-D illustrate how data is transferred between various components of system 300 in FIG. 3 to provide videoconferencing in a virtual environment such as the virtual environment of FIG. 1. Like FIG. 3, each of FIGS. 4A-C depict the connection between server 302 and devices 306A and 306B. In particular, FIGS. 4A-C illustrate example data flows between those devices.

FIG. 4A illustrates a diagram 400 for describing how server 302 transmits data describing the virtual environment to devices 306A and 306B. In particular, both devices 306A and 306B, receive from server 302 the three-dimensional arena 404, background texture 402, space hierarchy 408 and any other three-dimensional modeling information 406.

As described above, background texture 402 is an image illustrating distant features of the virtual environment. The image may be regular (such as a brick wall) or irregular. Background texture 402 may be encoded in any common image file format, such as bitmap, JPEG, GIF, or other file image format. It describes the background image to be rendered against, for example, a sphere at a distance.

Three-dimensional arena 404 is a three-dimensional model of the space in which the conference is to take place. As described above, it may include, for example, a mesh and possibly its own texture information to be mapped upon the three-dimensional primitives it describes. It may define the space in which the virtual camera and respective avatars can navigate within the virtual environment. Accordingly, it may be bounded by edges (such as walls or fences) that illustrate to users the perimeter of the navigable virtual environment.

Space hierarchy 408 is data specifying partitions in the virtual environment. These partitions are used to determine how sound is processed before being transferred between participants. As will be described below, this partition data may be hierarchical and may describe sound processing to allow for areas where participants to the virtual conference can have private conversations or side conversations.

Three-dimensional model 406 is any other three-dimensional modeling information needed to conduct the conference. In one embodiment, this may include information describing the respective avatars. Alternatively, or additionally, this information may include product demonstrations.

With the information needed to conduct the meeting sent to the participants, FIGS. 4B-C illustrate how server 302 forwards information from one device to another. FIG. 4B illustrates a diagram 440 showing how server 302 receives information from respective devices 306A and 306B, and FIG. 4C illustrates a diagram 460 showing how server 302 transmits the information to respective devices 306B and 306A. In particular, device 306A transmits position and direction 422A, video stream 424A, audio stream 426A, and a list of users 428A to server 302. List of users 428A may be a list of users which are able to hear device 306A's user within the three-dimensional virtual space. Server 302 determines that device 306B's user may be able to hear device 306A's user based on list of users 428A. As a result, server 302 may transmit position and direction 422A, video stream 424A, and audio stream 426A to device 306B.

Device 306B transmits position and direction 422B, video stream 424B, audio stream 426B, and list of users 428B to server 302. List of users 428B may be a list of users which are able to hear device 306B's user within the three-dimensional virtual space. Server 302 determines that device 306A's user may be able to hear device 306B's user based on list of users 428B. As a result, server 302 may transmit position and direction 422B, video stream 424B, and audio stream 426B to device 306A.

Position and direction 422A and 422B describe the position and direction of the virtual camera for the user using device 306A. As described above, the position may be a coordinate in three-dimensional space (e.g., x, y, z coordinate) and the direction may be a direction in three-dimensional space (e.g., pan, tilt, roll). In some embodiments, the user may be unable to control the virtual camera's roll, so the direction may only specify pan and tilt angles. Similarly, in some embodiments, the user may be unable to change the avatar's z coordinate (as the avatar is bounded by virtual gravity), so the z coordinate may be unnecessary. In this way, position and direction 422A and 422B each may include at least a coordinate on a horizontal plane in the three-dimensional virtual space and a pan and tilt value. Alternatively, or additionally, the user may be able to "jump" the avatar of the user, so the Z position may be specified only by an indication of whether the user is jumping the avatar.

In different examples, position and direction 422A and 422B may be transmitted and received using HTTP request responses or using socket messaging.

Video streams 424A and 424B contain video data captured from a camera of the respective devices 306A and 306B. The video may be compressed. For example, the video may use any commonly known video codecs, including MPEG-4, VP8, or H.264. The video may be captured and transmitted in real time.

Similarly, audio streams 426A and 426B is audio data captured from a microphone of the respective devices of the participants. The audio may be compressed. For example, the audio may use any commonly known audio codecs, including MPEG-4 or vorbis. The audio may be captured and transmitted in real time. Video stream 424A and audio stream 426A are captured, transmitted, and presented synchronously with one another. Similarly, video stream 424B and audio stream 426B are captured, transmitted, and presented synchronously with one another.

Video streams 424A and 424B and audio streams 426A and B may be transmitted using an API such as the WebRTC (Web Real-Time Communication) API. WebRTC is an API available in JavaScript. As described above, devices 306A and 306B download and run web applications, as conference applications 310A and 310B, and conference applications 310A and 310B may be implemented in JavaScript. Conference applications 310A and 310B may use WebRTC to receive and transmit video stream 424A and 424B and audio streams 426A and 426B by making API calls from its JavaScript.

List of users 428A and 428B may be data structures configured to user identifying information. The data structure may include lists, queues, struts, indexes, etc. For example, list of users 428A and 428B may include usernames, user IDs, email addresses, or other user information. List of users 428A and 428B indicates which users in the virtual environment during a virtual conference (e.g., three-dimensional virtual space) may hear a respective user of device 306A or 306B. Server 302 transmits respective audio stream 426A or 426B to devices corresponding to devices of users on respective list of users 428A or 428B. Server 302 prevents the transmission of audio stream 426A or 426B received from respective device 306A or 306B to the devices of users not on respective list of users 428A or 428B.

List of users 428A and 428B include users that are able to hear the given user at a sound volume above a threshold amount. The sound volume at which users are able to hear the given user may be determined based on a respective position in the virtual environment of the user's respective avatar relative to a position of the given user's virtual camera in the virtual environment. For example, the sound volume may be determined based on a distance of a respective avatar from the given user's virtual camera, wall transmission factors of areas in the three-dimensional virtual space, and distance transmission factors of areas in the three-dimensional virtual space. The sound volume at which users are able to hear the given user may also be determined based on the avatars' position and direction in the three-dimensional virtual space, predetermined user groups, user role, user importance, user selection, etc. The calculation of sound volume will be described further with respects to FIGS. 5-10B.

In some embodiments, server 302 generates list of users 428A and 428B by calculating which users are able to hear a given user at a sound volume exceeding a threshold amount. Server 302 calculates the sound volume based on the avatars' position and direction in the three-dimensional virtual space, predetermined user groups, user role, user importance, user selection, etc. Server 302 may transmit respective audio stream 426A or 426B to devices of the users on respective list of users 428A or 428B. Server 302 may prevent the transmission of audio stream 426A or 426B received from respective device 306A or 306B to the devices of users not on respective list of users 428A or 428B.

In some embodiments, in the event devices 306A and 306B communicate with one another as on a peer-to-peer basis, devices 306A and 306B may transmit respective audio stream 426A or 426B to the devices of users on respective list of users 428A or 428B. Likewise, devices 306A and 306B may prevent the transmission of respective audio stream 426A or 426B to the devices of users not on respective list of users 428A or 428B.

As mentioned above, when a user leaves the virtual conference, this departure is communicated to all other users. For example, if device 306A exits (disconnects from) the virtual conference, server 302 would communicate that departure to device 306B. Consequently, device 306B would stop rendering an avatar corresponding to device 306A, removing the avatar from the virtual space. Additionally, device 306B will stop receiving video stream 424A and audio stream 426A.

As described above, conference applications 310A and B may periodically or intermittently re-render the virtual space based on new information from respective video streams 424A and 424B, position and direction 422A and 422B, and new information relating to the three-dimensional environment. For simplicity, each of these updates are now described from the perspective of device 306A. However, a skilled artisan would understand device 306B would behave similarly given similar changes.

As device 306A receives video stream 424B, device 306A texture maps frames from video stream 424B on to an avatar corresponding to device 306B. That texture mapped avatar is re-rendered within the three-dimensional virtual space and presented to a user of device 306A.

As device 306A receives a new position and direction 422B, device 306A generates the avatar corresponding to device 306B positioned at the new position and oriented at the new direction. The generated avatar is re-rendered within the three-dimensional virtual space and presented to the user of device 306A.

In some embodiments, server 302 may send updated model information describing the three-dimensional virtual environment. For example, server 302 may send updated information 402, 404, 406, or 408. When that happens, device 306A will re-render the virtual environment based on the updated information. This may be useful when the environment changes over time. For example, an outdoor event may change from daylight to dusk as the event progresses.

Again, when device 306B exits the virtual conference, server 302 sends a notification to device 306A indicating that device 306B is no longer participating in the conference. In that case, device 306A would re-render the virtual environment without the avatar for device 306B.

Figure 4D:
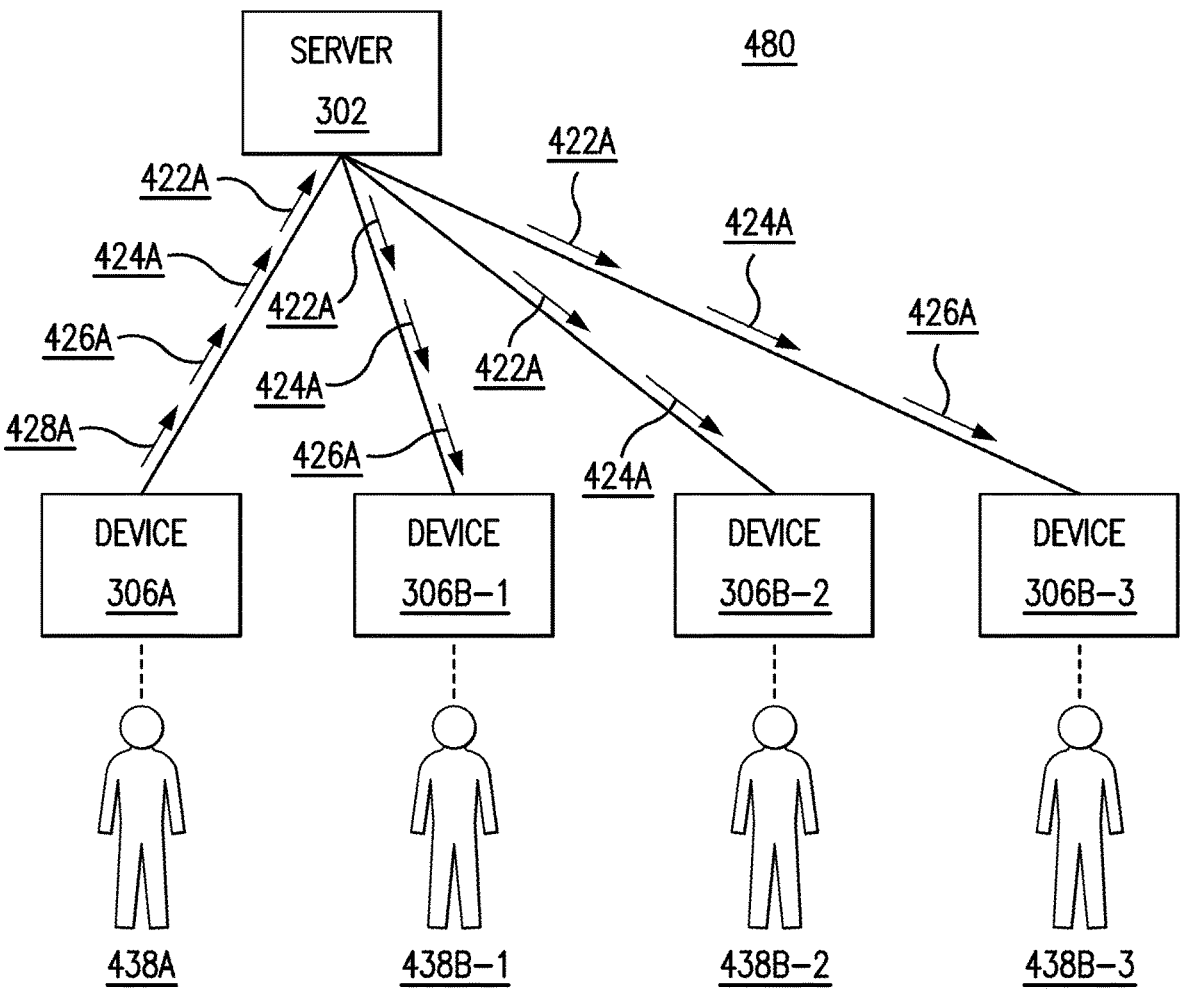

FIG. 4D illustrates a diagram 480 for describing how server 302 selectively transmits audio streams from one device to another. As a non-limiting example, a system to provide video conferencing may include server 302, device 306A, device 306B-1, device 306B-2, and device 306B-3. Each of device 306B-1, 306B-2, and 306B-3 may be analogous to device 306B, as described in FIGS. 3 and 4A-4C. Device 306A may correspond to a user 438A (e.g., speaking user), device 306B-1 may correspond to a user 438B-1, device 306B-2 may correspond to user 438B-2, and device 306B-3 may correspond to user 438B-3.

Device 306A or server 302 may determine that the sound volume at which user 438B-1 and user 438B-3 are able to hear user 438A in the virtual environment exceeds a threshold amount. Furthermore, device 306A or server 302 may determine that the sound volume at which user 438B-2 is able to hear user 438A in the virtual environment is lower than the threshold amount. As such, device 306A or server 302 may determine that user 438B-1 and user 438B-3 are able to hear user 438A in the three-dimensional virtual space, while user 438B-2 cannot hear user 438A. Device 306A or server 302 may generate list of users 428A. List of users 428A may include user identifying information of user 438B-1 and user 438B-3. Device 306A may transmit position and direction 422A, video stream 424A, audio stream 426A, and list of users 428A to server 302, as described above. As described above, in some embodiments, server 302 may generate List of users 428A.

Server 302 may receive the position and direction 422A, video stream 424A, audio stream 426A, and a list of users 428A. Server 302 may correlate the user identifying information included on List of users 428A with the corresponding devices. For example, server 302 may determine user 438B-1 corresponds with device 306B-1 and user 438B-3 corresponds with device 306B-3. Server 302 may transmit position and direction 422A, video stream 424A, and audio stream 426A to device 306B-1 and 306B-3 based on user 438B-1 and user 438B-3 being included in list of users 428A. Server 302 may transmit position and direction 422A and video stream 424A to device 306B-2, however, server 302 may not transmit the audio stream to device 306B-2 as user 438B-2 cannot hear user 438A in the virtual environment.

While examples of system 300 of FIG. 3 as described in FIGS. 4A-D is illustrated with two devices for simplicity, a skilled artisan would understand that the techniques described herein can be extended to any number of devices. Also, while examples of system 300 of FIG. 3 as described in FIGS. 4A-D is illustrated with a single server 302, a skilled artisan would understand that the functionality of server 302 can be spread out among a plurality of computing devices. In an embodiment, the data transferred in FIG. 4A may come from one network address for server 302, while the data transferred in FIGS. 4B-D can be transferred to/from another network address for server 302.

In one embodiment, participants can set their webcam, microphone, speakers and graphical settings before entering the virtual conference. In an alternative embodiment, after starting the application, users may enter a virtual lobby where they are greeted by an avatar controlled by a real person, referred to as an attendant. The attendant is able to view and modify the webcam, microphone, speakers and graphical settings of the user. The attendant can also instruct the user on how to use the virtual environment, for example by teaching them about looking, moving around and interacting with the various elements in the virtual environment. When they are ready, the user automatically leaves the virtual waiting room and joins the real virtual environment. Identifying Users that are Able to Hear a Speaker in a Video Conference in a Virtual Environment and Securing Private Communication in the Virtual Environment Embodiments described herein also identify users that are able to hear a given user in a virtual environment during a video conference, and selectively transmit an audio stream of a given user to users that are able to hear the given user in the video conference in the virtual environment. This is illustrated, for example, in FIGS. 5-7, 8A-B, 9A-C, and 10A-C, each of which is described below.

Users may desire to have private conversations in a virtual environment during a videoconference. However, the audio stream of a given user may be transmitted to a plurality of devices corresponding to users that may not be desirable as part of the private conversations. Even if the sound volume of the audio stream is attenuated for users not in the private conversation, one or more of these users may increase an amplification volume of their speakers to listen in on the private conversation. As such, the given user may desire to selectively transmit the audio stream only to users that are desired as part of the private conversation. This is illustrated in FIG. 5.

Figure 5:
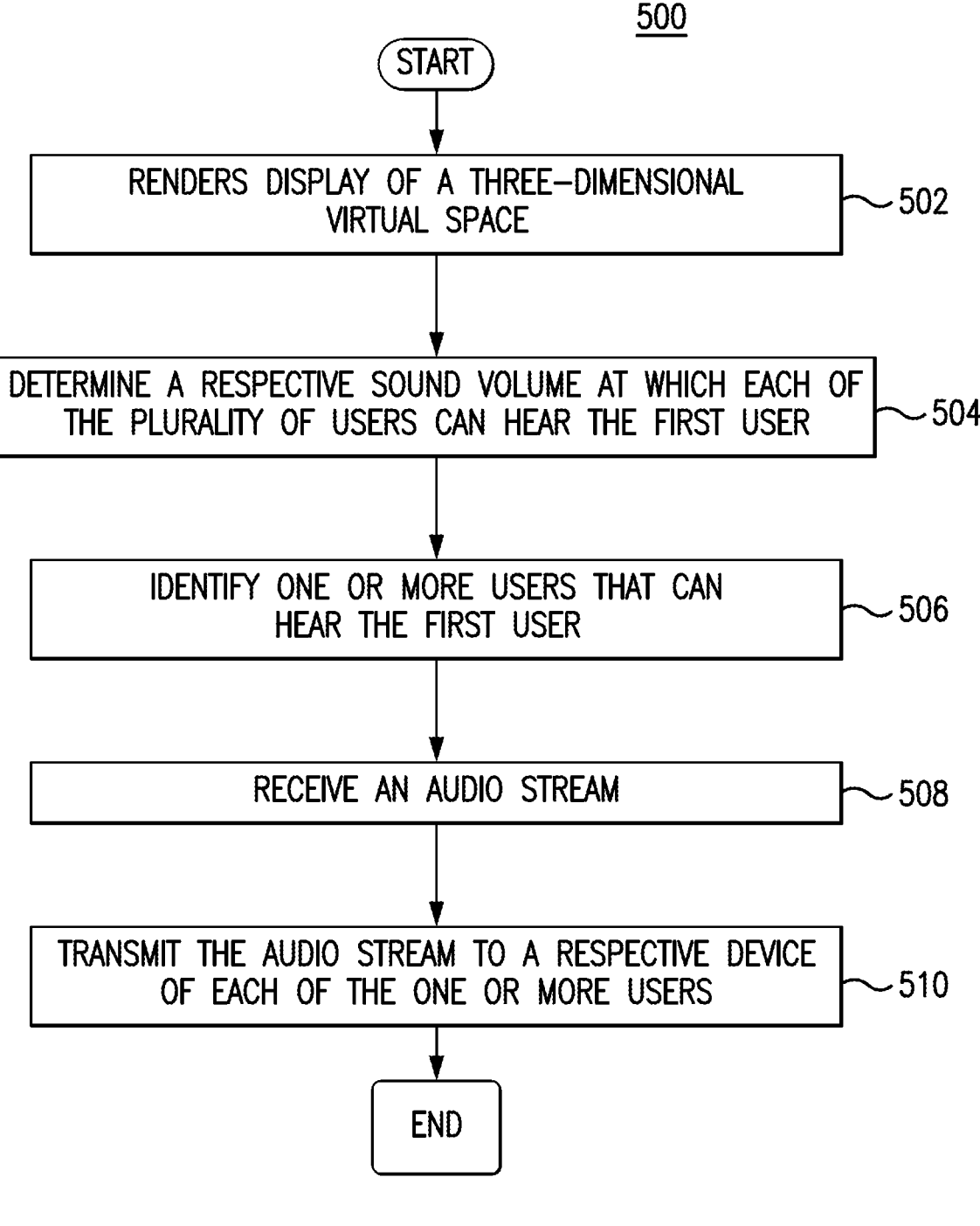
FIG. 5 is a flowchart illustrating a method for selectively transmitting an audio stream of a given user to other users that are able to hear the given user in a video conference in a virtual environment.

FIG. 5 is a flowchart illustrating a method 500 for selectively transmitting an audio stream of a given user to users that are able to hear the given user in a video conference in a virtual environment. Method 500 shall be described with reference to FIG. 4D. However, method 500 is not limited to that example embodiment.

At step 502, device 306A receives an audio stream 426A from a microphone of a device of user 438A, who, in the example in FIG. 4D, is speaking. For example, the microphone may be positioned to capture speech of user 438A. The audio stream includes sound signal and associated sound signal level data for the captured speech. In some embodiments, device 306A transmits audio stream 426A to server 302.

At step 504, a display of a virtual environment during a virtual conference (e.g., three-dimensional virtual space) is rendered for a participant such as the user 438A from the perspective of the participant's virtual camera. The virtual environment includes a plurality of avatars. Each user is represented by a respective avatar of the plurality of avatars. For example, the virtual environment may include avatars for user 438B-1, user 438B-2, and user 438B-3. User 438A may correspond with device 306A, user 438B-1 may correspond with device 306B-1, user 438B-2 may correspond with device 306B-2, and user 438B-3 may correspond with device 306B-3.

At step 506, a sound volume at which each of the other participants to the conference (the users of devices 306B-1, 306B-2, and 306B-3 in the example in FIG. 4D) are able to hear the speaking user in the virtual environment is determined. As further described herein, the term "sound volume" represents a sound level for reproducing sound for a recipient of an audio stream, such as audio stream 426A from user 438A. As described herein, the sound volume may cause an attenuation or amplification of the reproduced sound, or leave it unchanged. The sound volume is determined based on a position of each participant's avatar relative to a position of the speaking user's virtual camera. In some embodiments, device 306A may determine the respective sound volumes. In other embodiments, server 302 may determine the respective sound volumes. Continuing from the above example, either device 306A or server 302 determines a sound volume at which user 438B-1 is able to hear user 438A in the virtual environment, a sound volume at which user 438B-2 is able to hear user 438A in the virtual environment, and a sound volume at which user 438B-3 is able to hear user 438A in the virtual environment.

The sound volume at which a respective user is able to hear the speaking user can be determined based on a combination of factors. For example, device 306A or server 302 may receive position and direction information associated with avatars corresponding to the user 438B-1, 438B-2, and 438B-3. As described above, the position may be a coordinate in the virtual environment (e.g., x, y, z coordinate) and the direction may be a direction in virtual environment (e.g., pan, tilt, roll). Device 306A or server 302 may use the position and direction information for each avatar to determine the distance between user 438A's virtual camera and each respective avatar in the virtual environment. The sound volume may roll-off as distance between the virtual camera and the avatar increases. This is illustrated in FIG. 6.

Figure 6:
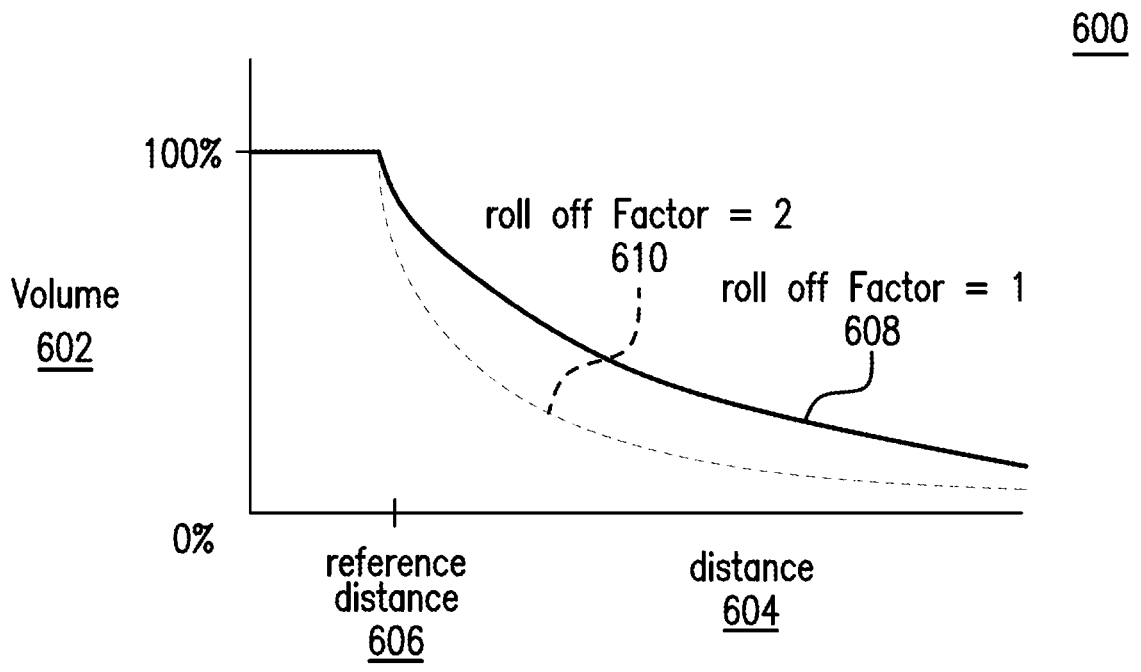
FIG. 6 is a chart illustrating how volume rolls off as distance between the avatars increases.

FIG. 6 shows a chart 600 illustrating how sound volume drops-off, or deteriorates, as distance between a particular avatar and the virtual camera of user 438A increases. Chart 600 includes a sound volume axis 602 as its y-axis and a distance axis 604 as its x-axis. In one embodiment, as distance between the avatar and the virtual camera increases, the sound volume stays constant until a reference distance 606 is reached. At that point, the sound volume begins to drop-off. In other words, once a distance between a particular avatar and the virtual camera has increased passed the referenced distance 606, then the sound volume for that particular avatar will drop-off. In this way, all other things being equal and assuming the reference distance 606 has been reached, from the perspective of a user who is listening to an avatar of another user, an avatar that is "closer" will often sound "louder" than an avatar that is farther away.

How fast the sound volume drops-off depends on a roll-off factor. In an example illustrated by line 608 and line 610 of chart 600, each of which represent a particular roll-off factor approach, a greater roll-off factor will cause sound volume to drop-off, or deteriorate, more rapidly than a lesser one. The roll-off factor may be based on formulas that models how distance between a speaker and listener in the "real-world" affects sound. The roll-off factor may also be based on a set of rules. Roll-off factors may also be combined. A predetermined roll-off factor or a set of roll-off factors, which may also be referred to as a roll-off factor profile (or profiles), may be built into the settings of the videoconferencing system or the client device. Various examples are described herein for how one or more roll-off factors may be applied.

The virtual environment may be partitioned into different areas, referred to as volume areas, each of which may affect sound volumes. Device 306A (or server 302) determines in which volume areas the respective avatars and the virtual camera are located. Thus, the sound volume at which a respective user is able to hear user 438A may also be determined based on volume areas present in the virtual environment. Each of the volume areas can have different roll-off factors. The distance-based calculation shown in method 600 may be applied for individual volume areas based on their respective roll off factors. In this way, different volume areas of the virtual environment affects sound volumes differently, the results of the effect may be cumulative.

Figure 8A:
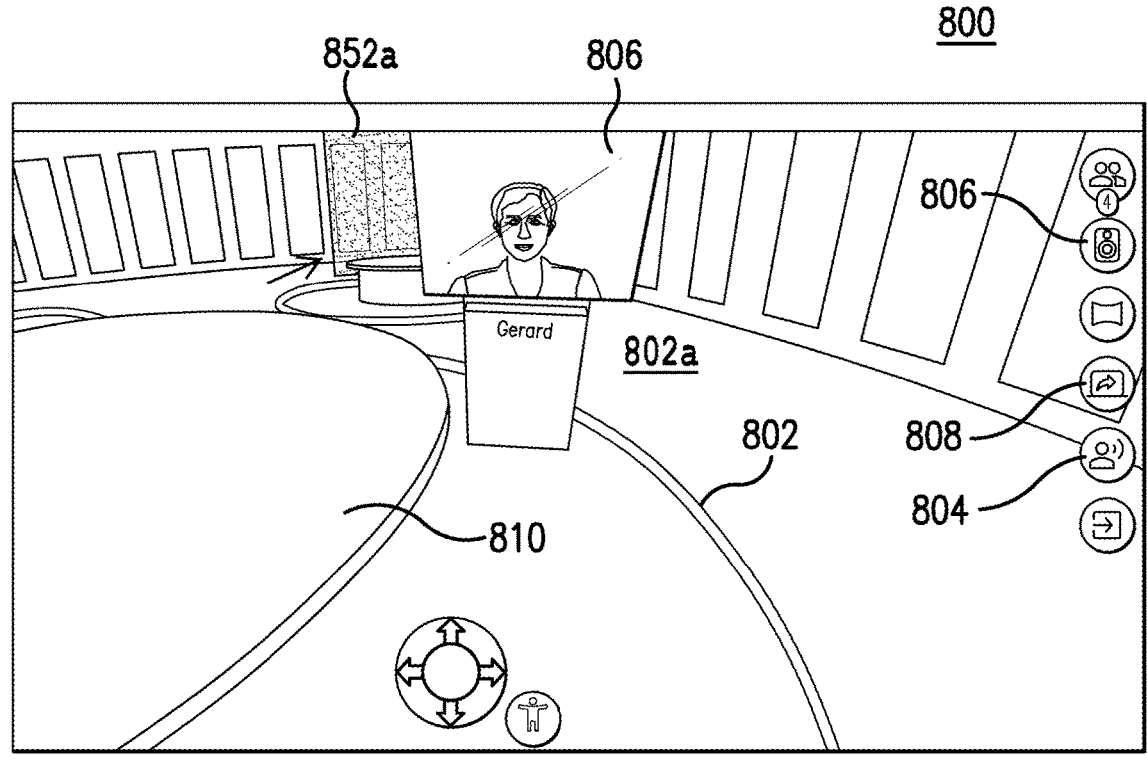
FIGS. 8A-B are diagrams illustrating different volume areas in a virtual environment during a videoconference.
Figure 8B:
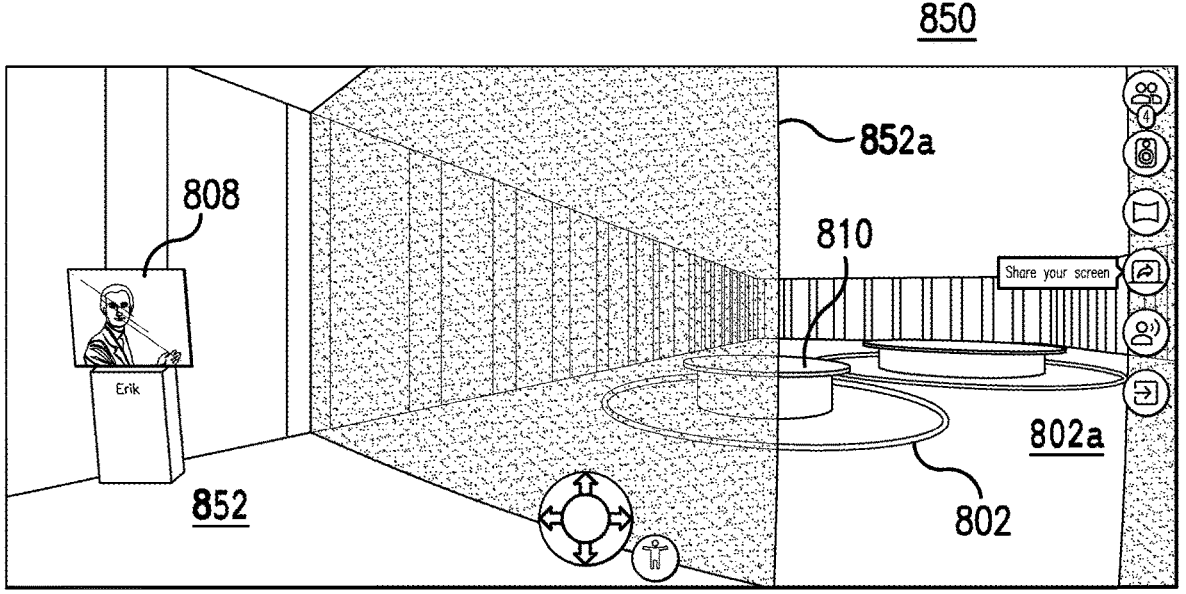

For example, FIGS. 8A-B illustrate different volume areas in a virtual environment during a videoconference. FIG. 8A illustrates an interface 800 displaying a volume area 802 with a conference table 810 that allows for a semi-private or side conversation between a user (e.g., user 438B-1, but may be user 438B-2 or user 438B-3) controlling avatar 806 and a user (e.g., user 438A) controlling the virtual camera. Interface 800 also displays a volume area 852 for providing private conversations, as described here.

The users are sitting around conference table 810 and are considered to be in volume area 802. Volume area 802 can be set to have a relatively high roll-off factor and a relatively short reference distance to increase drop-off of sound volume. In this way, the users around conference table 810 can have a conversation without disturbing others in the room because ostensibly the users sitting around conference table 810 will be within the shortened reference distance. However, the sound volume for volume area 802 may be configured to not entirely drop-off for avatars outside—but still within a certain distance, of volume area 802 to allow these passersby to join the conversation. For example, an avatar located in a volume area 802a may still have a high enough sound volume to hear the users sitting around conference table 810.

Interface 800 also includes buttons 804, 806, and 808, which will be described below.

FIG. 8B illustrates an interface 850 displaying a volume area 852 that allows for a private conversation between a user (e.g., user 438B-2, but may be user 438B-1, or user 438B-3) controlling avatar 808 and the user (e.g., user 438A) controlling the virtual camera. Volume area 852 may be behind wall 852a. Once inside volume area 852, audio from the user controlling avatar 808 and the user controlling the virtual camera may only be output to those inside volume area 852. As no audio at all is played from these users to others in the videoconference, in various implementations their audio streams are not transmitted to the other user devices. In other words, only devices associated with users having avatars within volume area 852 need to share audio streams. In various embodiments, even though their conversation is private, the users with their avatar in volume area 852 may still hear avatars outside of volume area 852.

Wall transmission factors may be used to isolate audio entirely. In an embodiment, this can be used to create virtual offices. For example, each user may have a monitor in their physical (perhaps home) office displaying a conference application that is constantly on and logged into a virtual office. Various aspects of the current invention allows the user to indicate whether the user is "in the office" or should not be disturbed (e.g., the user can set a do-not-disturb indicator). If the do-not-disturb indicator is off, a visitor, such as a coworker or manager, may enter the virtual space, either knocking before or simply walking in as one would be able to in a physical office. The visitor may be able to leave a note if the user is not present in their office. When the user returns, they would be able to read the note left by the visitor. The virtual office may have a whiteboard and/or an interface that displays messages for the user. The messages may be an email and/or created from a messaging application such as the SLACK application available from Slack Technologies, Inc. of San Francisco, CA.

Volume spaces may be hierarchical, as illustrated in FIGS. 9A and 9B, where FIG. 9B is a diagram 930 shows a layout with different volume areas arranged in a hierarchy. Volume areas 934 and 935 are within volume area 933, and volume area 933 and 932 are within volume area 931. These volume areas are represented in a hierarchical tree, as illustrated in diagram 900 of FIG. 9A, as further described herein.

In diagram 900, node 901 represents volume area 931 and is the root of the tree. Nodes 902 and 903 are children of node 901, and represent volume areas 932 and 933, respectively. Nodes 904 and 906 are children of node 903, and represent volume areas 934 and 935.

If a user located in an area 934 is trying to listen to speaking a user who is located in area 932, the audio stream has to pass through a number of different virtual "walls," each attenuating the sound volume. In particular, the sound has to pass through the wall for area 932, the wall for area 933, and the wall for area 934. Each wall attenuates the sound volume by a particular factor.

For example, device 306A or server 302 may determine a sound volume at which different users may hear user 438A in the virtual environment based on wall transmission factors of areas between the virtual camera and the avatars in the virtual environment.

Figure 9C:
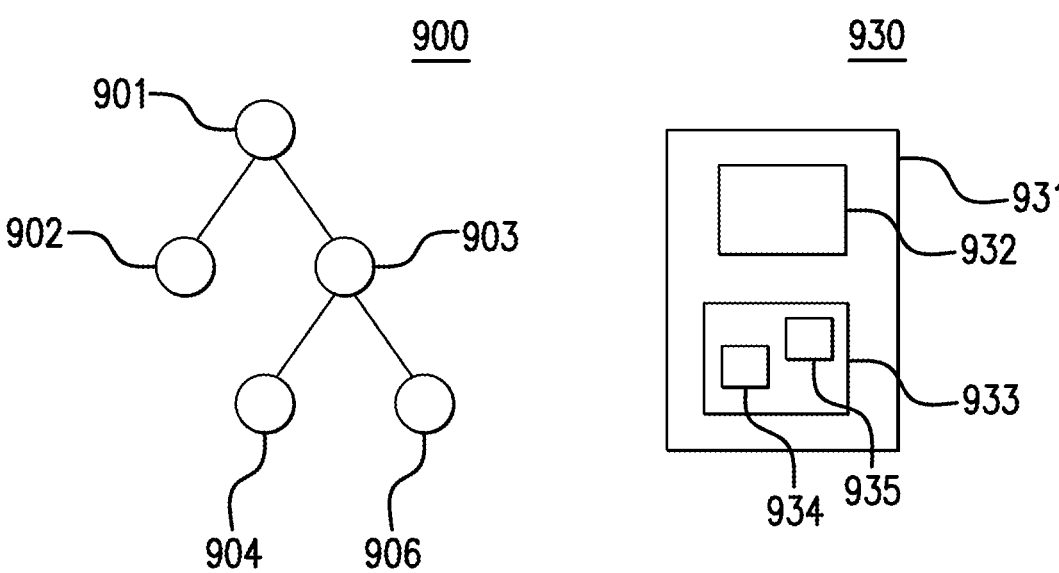
Figure 9C:
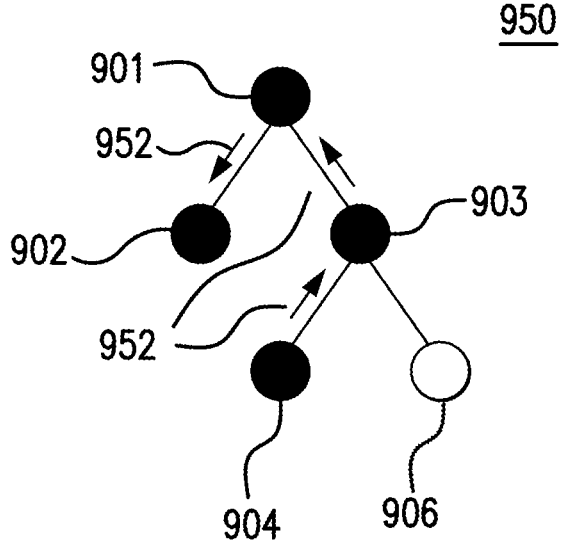

This is illustrated, for example, in FIG. 9C. Starting from the node corresponding to the virtual area of the speaking voice (in this case node 904) a path to the node of the receiving user (in this case, node 902) is determined. To determine the path, the links 952 going between the nodes are determined. In this way, a subset of areas between an area including the avatar and an area including the virtual camera is determined. The sound volume at which users are able to hear the speaking user is attenuated based on respective wall transmission factors of each subset of areas. Each respective wall transmission factor specifies how much the sound volume is attenuated.

Returning to FIG. 5, at step 508, for each of the plurality of users whether a user is able hear user 438A is determined based on whether the respective sound volume exceeds a threshold amount. Continuing from the earlier example, device 306A or server 302 may determine that the sound volume at which user 438B-1 and 438B-3 are able to hear user 438A may be higher than the threshold amount. Furthermore, device 306A or server 302 may determine that the sound volume at which user 438B-2 is able to hear user 438A is lower than the threshold amount. As a result, device 306A or server 302 may determine that user 438B-1 and user 438B-3 are able to hear user 438A and user 438B-2 cannot hear user 438A. As a non-limiting example, the threshold amount may be 10%.

In one example, device 306A or server 302 generates list of users 428A including the user 438B-1 and user 438B-3, but excluding user 438-B2. List of users 428A indicates the users that are able to hear user 438A in the virtual environment. List of users 428A may include identifying information about user 438B-1 and user 438B-3.

In some embodiments, the sound volume at which other users are able to hear user 438A can be determined based on one or more of: line of sight, user groups, user role, user importance. For example, user 438A is directly facing another user and is proximate to the other user, device 306A or server 302 may determine that user 438A is attempting to have a private conversation with the other user. As a result, device 306A or server 302 may determine that the sound volume at which the other user is able to hear user 438A is higher than the threshold amount and the volume at which everyone else can hear user 438A is lower than the threshold amount.

In an example, device 306A or server 302 may determine that user 438A is attempting have a private conversation (e.g., meeting) with a group of users. The group may be predefined (e.g., a club, committee, board, cabinet, etc.). In this regard, user 438A may only want the users within the group to hear him. As such, device 306A may determine that the sound volume at which users within the group are able to hear user 438A is higher than the threshold amount based on information about the users within the group indicating that the users are part of the group. The audio stereo may be blocked to those outside the group. The information may be the user's profile information. This way, device 306A or server 302 may block or prevent transmission of audio stream 426A to users that are not in the group.

In another example, user 438A may actively block one or more users in the virtual environment from receiving audio stream 426A. Therefore, device 306A or server 302 may determine the users other than the one or more users in the virtual environment are able to hear user 438A based on information about the one or more users indicating that they have been actively blocked by user 438A. Device 306A or server 302 may block or prevent transmission of audio stream 426A to the one or more users.

In yet another example, device 306A or server 302 may determine that user 438A is attempting to have a private conversation with users of a predetermined user role. For example, the users of the predetermined user role may have a predetermined security clearance (or credentials) or may be authorized to discuss confidential information. As a non-limiting example, the user role may be Chief Executive Officer (CEO), general counsel, director, etc. Device 306A or server 302 may determine that the sound volume at which users of the predetermined user role are able to hear user 438A is higher than the threshold amount based on the information about the users of the predetermined user role indicating that the users are of the predetermined user role. The information may be the user's profile information.

In some embodiments, an avatar of a new user may move to a position in the virtual environment during the virtual conference such that device 306A or server 302 may determine that the sound volume at which the new user is able to hear user 438A is higher than the threshold amount. As a result, the new user is able to hear user 438A. The device of the new user may render a notification for the new user indicating that the new user is able to hear user 438A.

At step 510, audio stream 426A is prevented from being transmitted to a respective device of each of the users not able to hear user 438A based on List of users 428A. Audio stream 426 may be transmitted to a respective device of each of the users able to hear user 438A based on the list of 428A. For example, server 302 may receive audio stream 426A and List of users 428A from device 306A.

Continuing the example above, server 302 may correlate the identifying information about the user 438B-1 and user 438B-3 included in List of users 428A to the corresponding devices. For example, server 302 may determine that user 438B-1 corresponds to device 306B-1 and user 438B-3 corresponds to 306B-3. Server 302 may transmit audio stream 426A to device 306B-1 and device 306B-3. Server 302 may not transmit the audio stream to device 306B-2 which corresponds to user 438B-2, as user 438B-2 is not included in List of users 428A. In some embodiments, device 306A may transmit audio stream 426A to the respective device of each of the users able to hear user 438A based on List of users 428A. Moreover, device 306A may prevent the transmission of audio stream 426A to the respective device of each of the users not able to hear user 438A based on List of users 428A.

In some embodiments, server 302 may transmit an audio stream that is muffled (highly attenuated) and/or unintelligible to the devices of users that cannot hear user 438A. For example, server 302 may transmit a muffled and/or unintelligible audio stream to device 306B-2.

As avatars may move around in the virtual environment during a virtual conference, the sound volume at which some users are able to hear user 438A may drop below the threshold amount, while the sound volume at which some users are able to hear user 438A may increase above the threshold amount. As such, steps 502-510 of method 500 may need to be continuously executed so that server 302 can transmit user 438A's audio stream to the devices of users that are able to hear user 438A and prevent the transmission of user 438A's audio stream to users that are not able to hear user 438A.

Figure 7:
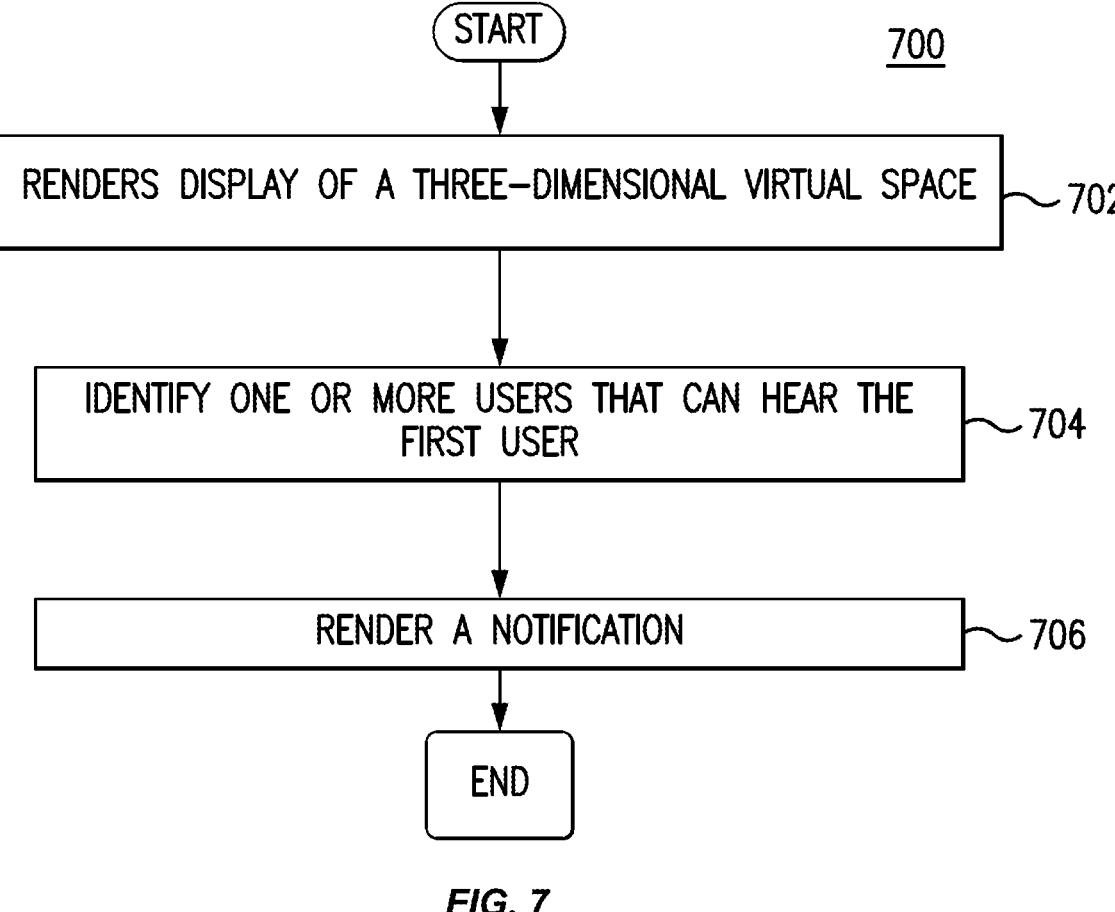
FIG. 7 is a flow chart illustrating a method for notifying a speaking user of other users that are able to hear the speaking user in a video conference in a virtual environment.

A given user in a virtual environment during a videoconference may not be aware of other users that are able to hear the given user due to the lack of vantage point, peripheral vision, nonverbal cues, sounds, etc. As a result, the given user may need to be notified of the other users that are able to hear the given user. FIG. 7 illustrates the process of notifying a user such as the given user of other users that are able to hear the user.

FIG. 7 is a flow chart illustrating a method 700 for notifying a speaking user of other users that are able to hear the speaking user in a video conference in a virtual environment. Method 700 shall be described with reference to FIG. 4D. However, method 700 is not limited to that example embodiment.

At step 702, a virtual environment during a virtual conference (e.g., three-dimensional virtual space) is rendered for user 438A. As described above, device 306A or server 302 may render the virtual environment. The virtual environment may include a plurality of avatars. Each respective avatar may correspond with a user of a plurality of users. For example, the virtual environment may include avatars for user 438B-1, user 438B-2, and user 438B-3. User 438B-1 may correspond with device 306B-1, user 438B-2 may correspond with device 306B-2, and user 438B-3 may correspond with device 306B-3.

At step 704, users that are able to hear user 438A in the virtual environment are determined based on a respective sound volume at which each user is able to hear user 438A having exceeded a threshold amount. As described above, device 306A or server 302 may determine the users that are able to hear user 438A. Device 306A or server 302 identifies the users that are able to hear user 438A as described in method 500 with respect to FIG. 5.

At step 706, a notification is rendered for user 438A indicating the users that are able to hear user 438A in the virtual environment. Device 306A or server 302 may render the notification for user 438A. This is illustrated in FIGS. 10A-10C.

Figure 10A:
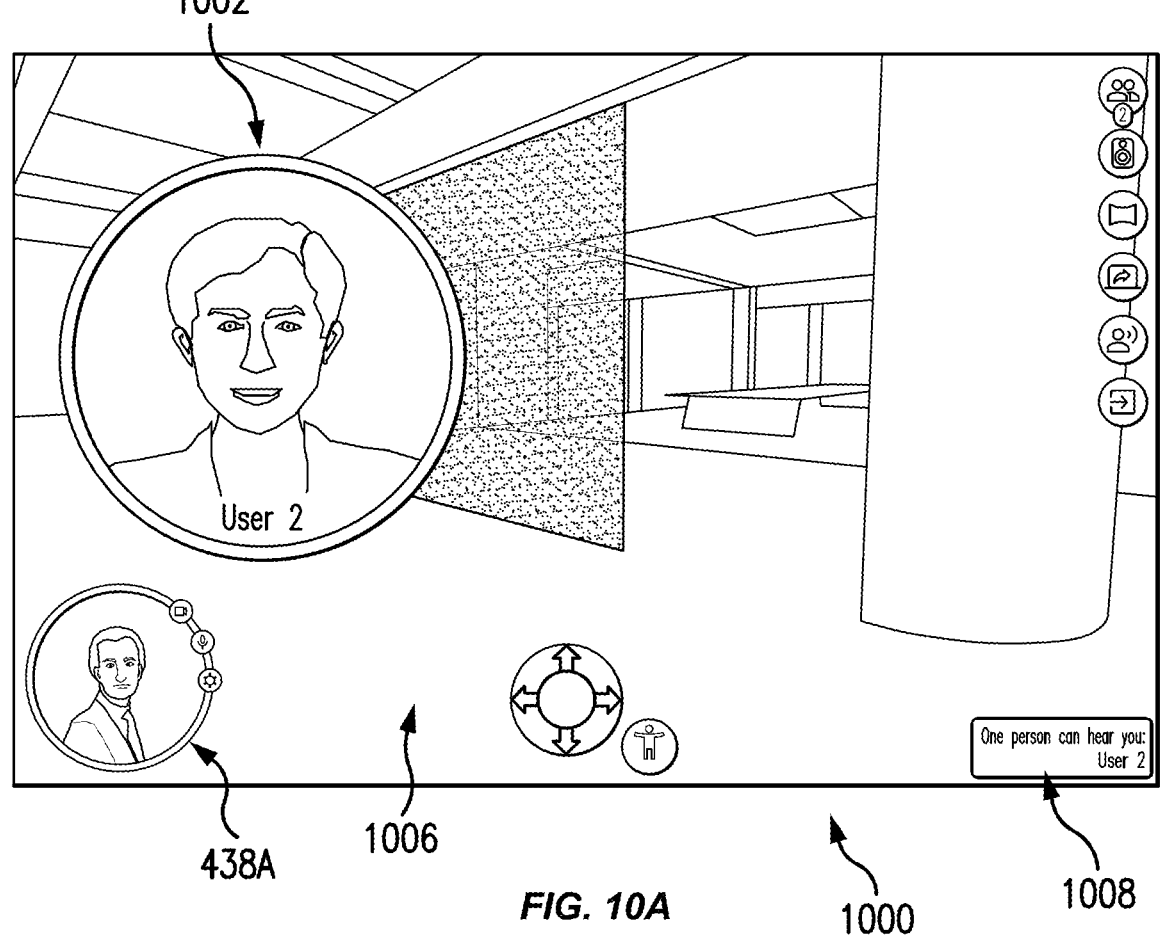
FIGS. 10A-10C are diagrams illustrating a notification rendered for a speaking user of other users in the virtual environment that are able to hear the speaking user.
Figure 10B:
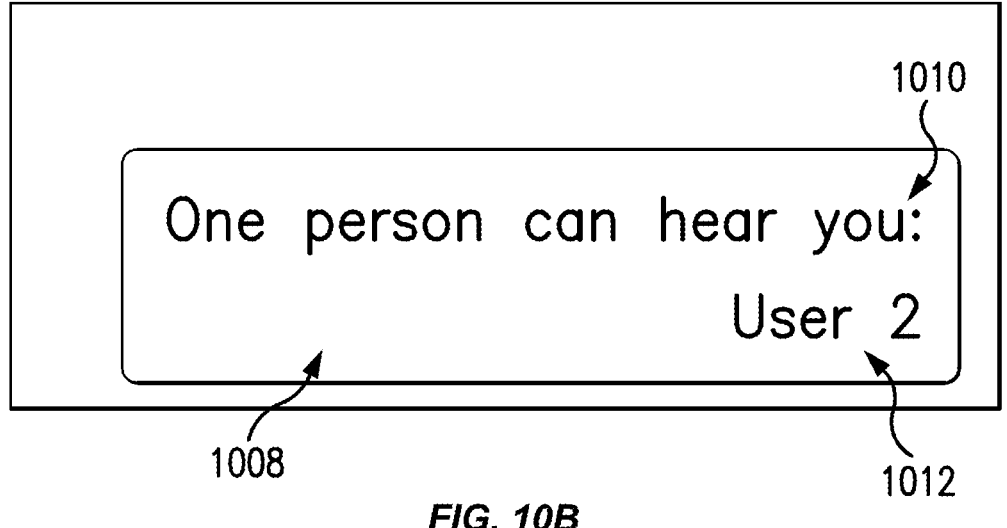
Figure 10C:
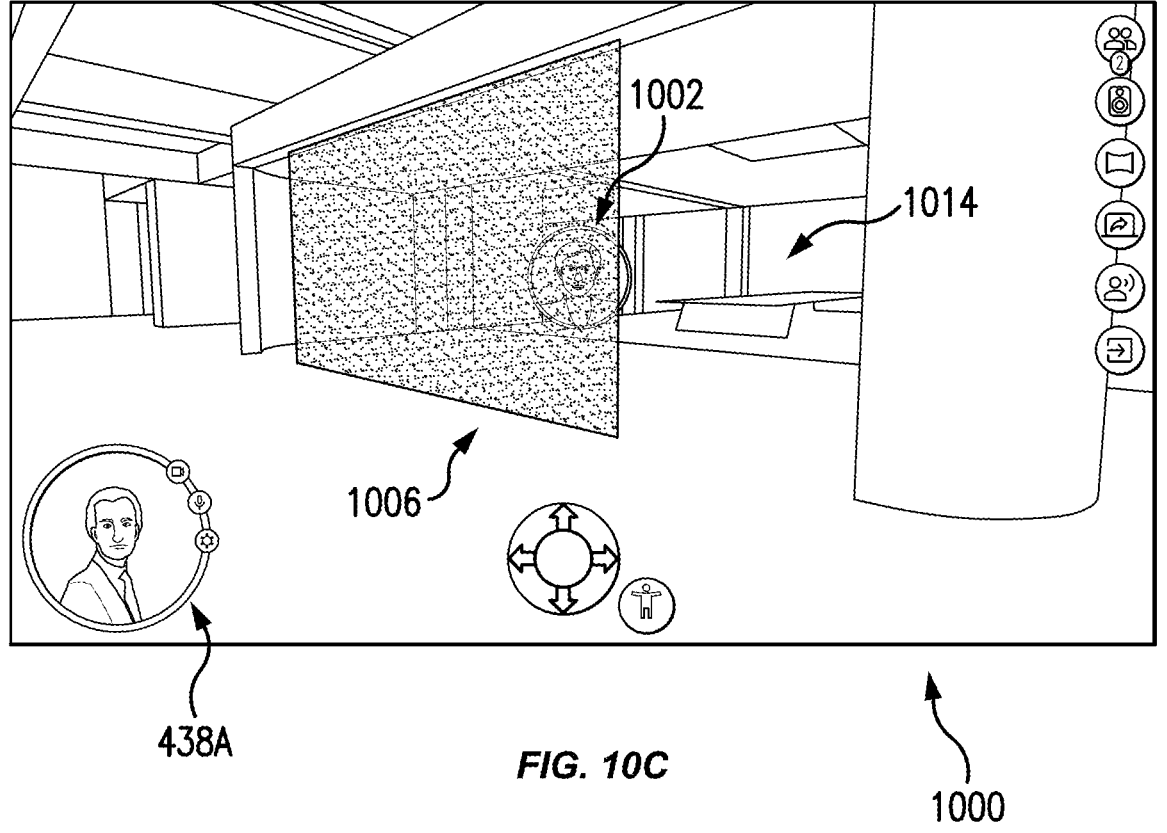

FIGS. 10A-10C illustrate a notification rendered for a speaking user of other users in the virtual environment that are able to hear the speaking user.

With reference to FIG. 10A, a virtual environment 1000 rendered for user 436A is illustrated. Virtual environment 1000 may include avatar 1002 representing user 438B-1. User 438B-1's username may be "User 2". The virtual camera for user 438A and avatar 1002 may be positioned in a first area 1006 of virtual environment 1000.

Device 306A or server 302 may determine that a sound volume at which user 438B-1 may hear user 438A exceeds the threshold amount based on one or more of a distance between user 438A's virtual camera and avatar 1002, a distance transmission factor of any volume area between user 438A's virtual camera and avatar 1002, and a wall transmission factor of any volume area between user 438A's virtual camera and avatar 1002. In this example, device 306A may determine that user 438A's virtual camera and avatar 1002 are in the same area (i.e., first area 1006), and based on their proximate distance to each other, the sound volume at which user 438B-1 is able to hear user 438A is greater than the threshold amount. Device 306A renders a notification 1008 for user 438A in the virtual environment 1000. Notification 1008 indicates that user 438B-1 is able to hear user 438A.

With reference to FIG. 10B, notification 1008 is illustrated. Notification 1008 may include a message 1010 indicating a total count of users that are able to hear user 438A. For example, message 1010 recites, "One person can hear you:". Furthermore, notification 1008 may include user 438B-1's identifying information 1012. In this example, identifying information 1012 is user 438B-1's username, "User 2." Identifying information 1012 may include nicknames, full names, email addresses, photos, videos, live webcam images, three-dimensional models, or graphical effects.

With reference to FIG. 10C, the virtual environment 1000 rendered for user 438A is illustrated. Device 306A may continuously determine which users are in the virtual environment 1000. As such, steps 702-706 of method 700 may need to be continuously executed. As avatars in the virtual environment 1000 may move around, certain users who could hear user 438A may move to a location where they can no longer hear user 438A. Alternatively, new users that could not hear user 438A may move to a location where they can hear user 438A. Notification 1008 may be updated to reflect which users in the virtual environment 1000 are able to hear user 438A in (near) real-time.

For example, avatar 1002 can move from first area 1006 to second area 1014, while user 438A remains in the first area. Second area 1014 may be a conference room. Device 306A may determine that based on one or more of the distance between user 438A's virtual camera and avatar 1002, a distance transmission factor of any volume area between user 438A's virtual camera and avatar 1002, and a wall transmission factor of any volume area between user 438A's virtual camera and avatar 1002, the sound volume at which user 438B-1 is able to hear user 438A is lower than the threshold amount. As a result, device 306A may determine that user 438B-1 can no longer hear user 438A. Device 306A may remove notification 1008 being displayed for user 438A.

In the event multiple users are able to hear user 438A, device 306A may remove identifying information 1012 corresponding to user 438B-1 from notification 1008. Furthermore, in the event device 306A determines one or more users are able to hear user 438A at a sound volume more than the threshold amount, device 306A may update notification 1008 to include the identifying information of the one or more users, as well as the total count of users that are able to hear user 438A.

In some embodiments, a given user that is able to hear user 438A in the virtual environment 1010 may not be visible to user 438A. For example, the avatar of the given user may be outside the view of user 438A 1004's virtual camera.

In some embodiments, different areas in the virtual environment may have different functionality. For example, a volume area may be a podium area. If user 438A is located in the podium area, some or all of the users may hear user 438A at a sound volume higher than the threshold amount. Thus, sound volumes may be amplified instead of being attenuated.

For exemplary purposes, FIGS. 5, 7, and 10A-10C are describing audio streams from a user who has a corresponding avatar. However, the same methods may be applied to other sound sources, other than for avatars. For example, the virtual environment may have three-dimensional models of speakers. Sound may be emitted from the speakers in the same way as the avatar models described above, either because of a presentation or just to provide background music.

Adjusting Volume for a Video Conference in a Virtual Environment

Embodiments also adjust volume to provide a sense of position and space within the virtual conference. This is illustrated, for example, in FIGS. 11 and 12, with reference to FIGS. 8A-B and 9A-C, each of which is described below.

Figure 11:
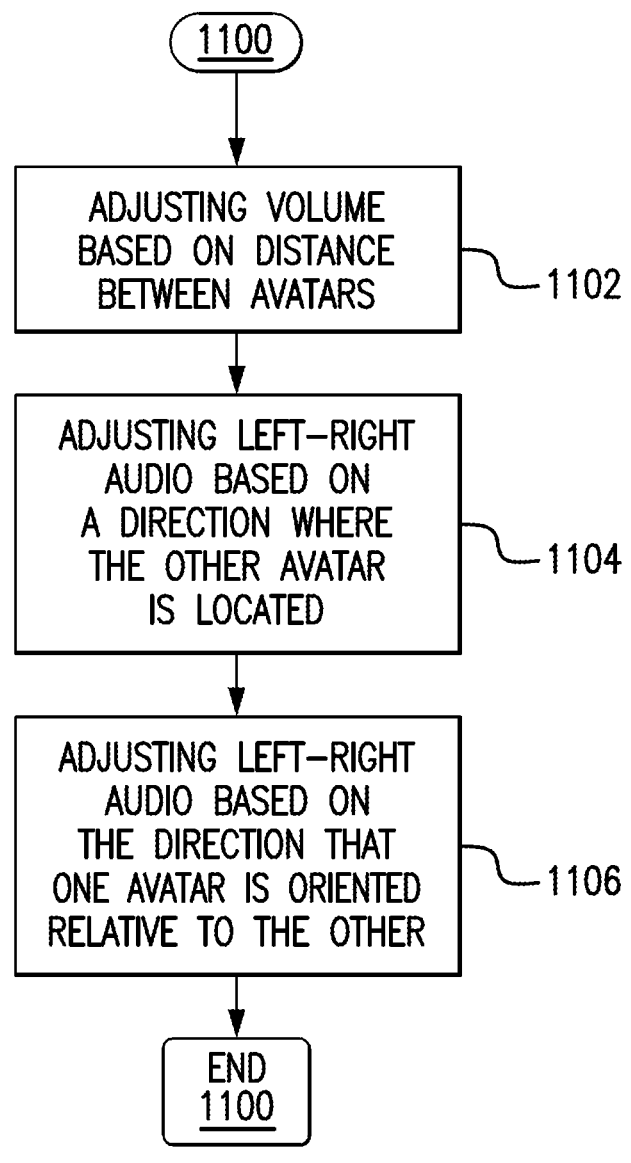
FIG. 11 is a flowchart illustrating a method for adjusting relative left-right volume to provide a sense of position in a virtual environment during a videoconference.

FIG. 11 is a flowchart illustrating a method 1100 for adjusting relative left-right volume to provide a sense of position in a virtual environment during a videoconference.

As described above, an audio stream of a speaking user may be transmitted to devices of one or more other users that are able to hear the speaking user. However, the positions of the avatars of each of the one or more users may be different. As a result, the relative left-right volume may need to be adjusted to provide a sense of position in the virtual environment during the videoconference.

At step 1102, volume is adjusted based on distance between the avatars. As described above, an audio stream from a microphone of a device of another user is received. The volume of both the first and second audio streams is adjusted based on a distance between the second position to the first position. As described above, this is illustrated in FIG. 6.

At step 1104, relative left-right audio is adjusted based on a direction where the avatar is located. That is, a volume of the audio to be output on the user's speaker (e.g., headset) will vary to provide a sense of where the speaking user's avatar is located. The relative volume of the left and right audio streams are adjusted based on a direction of a position where the user generating the audio stream is located (e.g., the location of the speaking user's avatar) relative to a position where the user receiving the audio is located (e.g., the location of the virtual camera). The positions may be on a horizontal plane within the virtual environment. The relative volume of the left and right audio streams to provide a sense of where the second position is in the virtual environment relative to the first position.

For example, at step 1104, audio corresponding to an avatar to the left of the virtual camera would be adjusted such that the audio is output on the receiving user's left ear at a higher volume than on the right ear. Similarly, audio corresponding to an avatar to the right of the virtual camera would be adjusted such that the audio is output on the receiving user's right ear at a higher volume than on the left ear.

At step 1106, relative left-right audio is adjusted based on the direction that one avatar is oriented relative to the other. A relative volume of the left and right audio streams is adjusted based on an angle between the direction where the virtual camera is facing and a direction where the avatar is facing such that the angle being more normal tends to have a greater difference in volume between the left and right audio streams.

For example, when an avatar is directly facing the virtual camera, the relative left-right volume of the avatar's corresponding audio stream may not be adjusted at all in step 1106. When the avatar is facing the left side of the virtual camera, the relative left-right volume of the avatar's corresponding audio stream may be adjusted so that left is louder than right. And, when the avatar is facing the right side of the virtual camera, the relative left-right volume of the avatar's corresponding audio stream may be adjusted so that right is louder than left.

In an example, the calculation in step 1106 may involve taking the cross product of the angle where the virtual camera is facing and the angle where the avatar is facing. The angles may be the direction they are facing on a horizontal plane.

In an embodiment, a check may be conducted to determine the audio output device the user is using. If the audio output device is not a set of headphones or another type of speaker that provides a stereo effect, the adjustments in steps 1104 and 1106 may not occur.

Steps 1102-1206 are repeated for every audio stream received from every other participant. Based on the calculations in steps 1102-1106, a left and right audio gain is calculated for every other participant.

In this way, the audio streams for each participant are adjusted to provide a sense of where the participant's avatar is located in the three-dimensional virtual environment.

Not only are audio streams adjusted to provide a sense of where avatars are located, but in certain embodiments, audio streams can be adjusted to provide private or semi-private volume areas. In this way, the virtual environment enables users to have private conversations. Also, it enables users to mingle with one another and allow separate, side conversations to occur, something that's not possible with conventional videoconferencing software. This is illustrated for example in with respect to FIG. 12.

Figure 12:
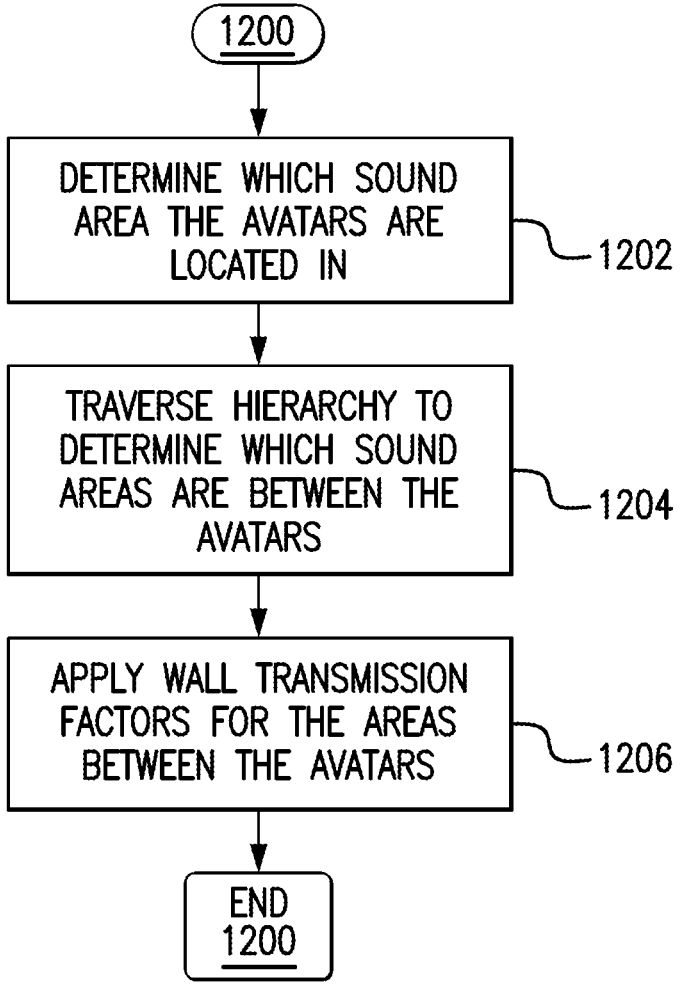
FIG. 12 is a flowchart illustrating a method for adjusting relative volume to provide different volume areas in a virtual environment during a videoconference.

FIG. 12 is a flowchart illustrating a method 1200 for adjusting relative volume to provide different volume areas in a virtual environment during a videoconference.

As described above, an audio stream of a speaking user may be transmitted to devices of one or more other users that are able to hear the speaking user. However, the positions of the avatars of each of the one or more users may be different. As a result, the sound volume at which the one or more users may need to be adjusted is determined based on their avatars' position in the virtual environment during the videoconference relative to user 438A's virtual camera.

The server may provide specification of sound or volume areas to the client devices. Virtual environment may be partitioned into different volume areas. At step 1202, a device determines in which volume areas the respective avatars and the virtual camera are located, as described above with respects to FIGS. 8A-9C.

At step 1204, the hierarchy is traversed to determine which various sound areas are between the avatars. This is illustrated, for example, in FIG. 9C. Starting from the node corresponding to the virtual area of the speaking voice (in this case node 904) a path to the node of the receiving user (in this case node 902) is determined. To determine the path, the links 952 going between the nodes are determined. In this way, a subset of areas between an area including the avatar and an area including the virtual camera is determined.

At step 1206, the audio stream from the speaking user is attenuated based on respective wall transmission factors of the subset of areas. Each respective wall transmission factor specifies how much the audio stream is attenuated.

As described above, the different areas have different roll off factors. In that case, the distance based calculation shown in method 600 may be applied for individual areas based on the respective roll off factors. In this way, different areas of the virtual environment affect sound volumes at different rates. The audio gains determined in the method as described above with respect to FIG. 11 may be applied to the audio stream to determine left and right audio accordingly. In this way, wall transmission factors, roll off factors, and left-right adjustments to provide a sense of direction for the sound may be applied together to provide a comprehensive audio experience.

Different audio areas may have different functionality. For example, a volume area may be a podium area. If the user is located in the podium area, some or all of the attenuation described with respect to FIG. 11 or 12 may not occur. For example, no attenuation may occur because of roll off factors or wall transmission factors. In some embodiments, the relative left-right audio may still be adjusted to provide a sense of direction.

For exemplary purposes, the methods described with respect to FIGS. 11 and 12 are describing audio streams from a user who has a corresponding avatar. However, the same methods may be applied to other sound sources, other than avatars. For example, the virtual environment may have three-dimensional models of speakers such as stereo or multi-speaker setups. Sound may be emitted from the speakers in the same way as the avatar models described above, either because of a presentation or just to provide background music.

As mentioned above, each user may have in their physical (perhaps home) office a monitor displaying the conference application constantly on and logged into the virtual office. Users may be able to customize or personalize their virtual offices. For example, they may be able to put up models of posters or other wall ornaments. They may be able to change models or orientation of desks or decorative ornaments, such as plantings. They may be able to change lighting or view out the window.

With reference to FIG. 8A, the interface 800 includes various buttons 804, 806, and 808. When a user presses the button 804, the attenuation described above with respect to the methods in FIGS. 11 and 12 may not occur, or may occur only in smaller amounts. In that situation, the user's voice is output uniformly to other users, allowing for the user to provide a talk to all participants in the meeting. The user video may also be output on a presentation screen within the virtual environment as well, as will be described below. When a user presses the button 806, a speaker mode is enabled. In that case, audio is output from sound sources within the virtual environment, such as to play background music. When a user presses button 808, a screen share mode may be enabled, enabling the user to share contents of a screen or window on their device with other users. The contents may be presented on a presentation model.

Figure 13:
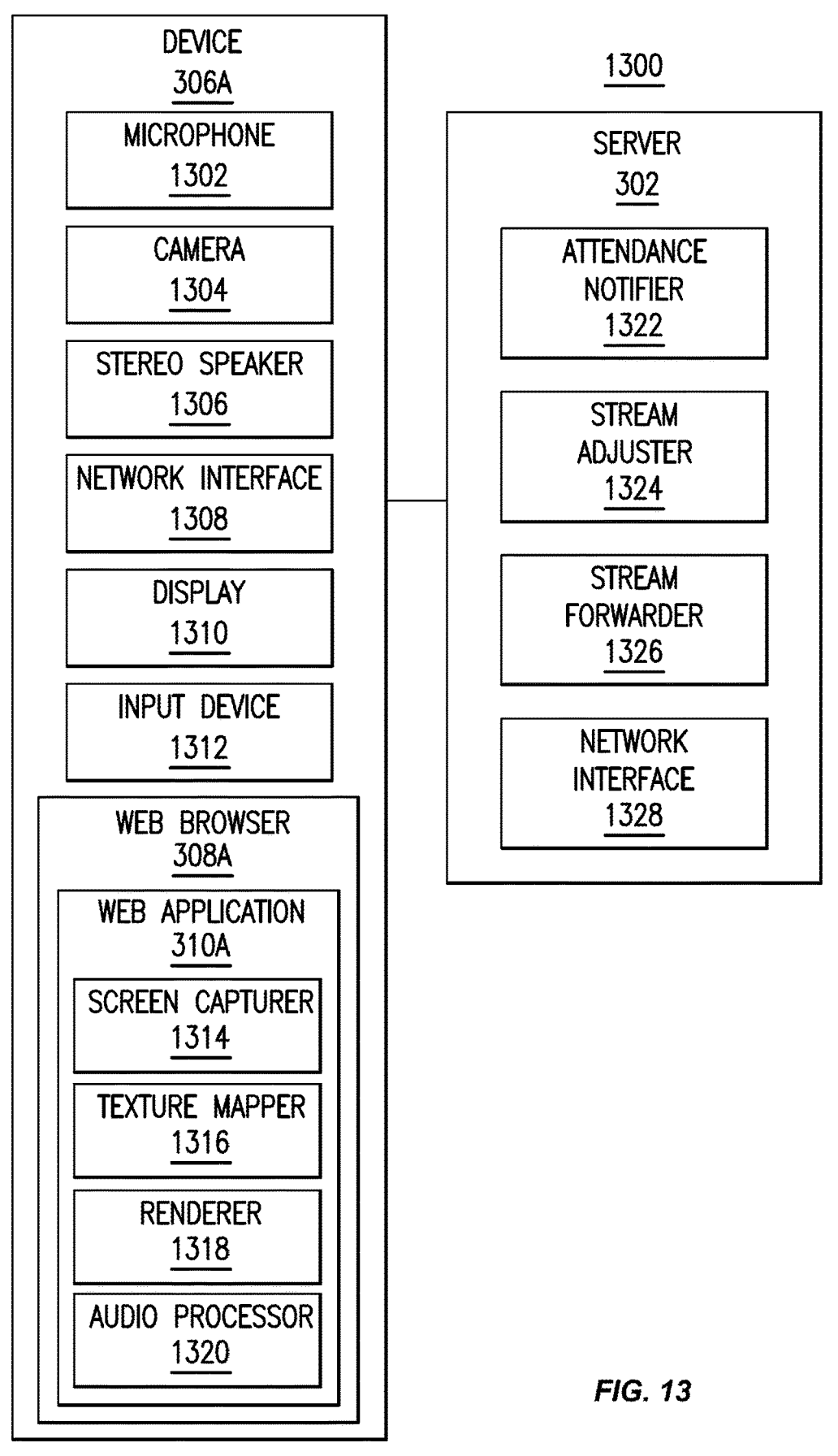

FIG. 13 is a diagram of a system 1300 illustrating components of devices used to provide videoconferencing within a virtual environment. In various embodiments, system 1300 can operate according to the methods described above.

Device 306A is a user computing device. Device 306A could be a desktop or laptop computer, smartphone, tablet, or wearable (e.g., watch or head mounted device). Device 306A includes a microphone 1302, camera 1304, stereo speaker 1306, input device 1312. Not shown, device 306A also includes a processor and persistent, non-transitory and volatile memory. The processors can include one or more central processing units, graphic processing units or any combination thereof.

Microphone 1302 converts sound into an electrical signal. Microphone 1302 is positioned to capture speech of a user of device 306A. In different examples, microphone 1302 could be a condenser microphone, electret microphone, moving-coil microphone, ribbon microphone, carbon microphone, piezo microphone, fiber-optic microphone, laser microphone, water microphone, or MEMs microphone.

Camera 1304 captures image data by capturing light, generally through one or more lenses. Camera 1304 is positioned to capture photographic images of a user of device 306A. Camera 1304 includes an image sensor (not shown). The image sensor may, for example, be a charge coupled device (CCD) sensor or a complementary metal oxide semiconductor (CMOS) sensor. The image sensor may include one or more photodetectors that detect light and convert to electrical signals. These electrical signals captured together in a similar timeframe comprise a still photographic image. A sequence of still photographic images captured at regular intervals together comprise a video. In this way, camera 1304 captures images and videos.

Stereo speaker 1306 is a device which converts an electrical audio signal into a corresponding left-right sound. Stereo speaker 1306 outputs the left audio stream and the right audio stream generated by an audio processor 1320 (below) to be played to device 306A's user in stereo. Stereo speaker 1306 includes both ambient speakers and headphones that are designed to play sound directly into a user's left and right ears. Example speakers include moving-iron loudspeakers, piezoelectric speakers, magnetostatic loudspeakers, electrostatic loudspeakers, ribbon and planar magnetic loudspeakers, bending wave loudspeakers, flat panel loudspeakers, heil air motion transducers, transparent ionic conduction speakers, plasma arc speakers, thermoacoustic speakers, rotary woofers, moving-coil, electrostatic, electret, planar magnetic, and balanced armature.

Network interface 1308 is a software or hardware interface between two pieces of equipment or protocol layers in a computer network. Network interface 1308 receives a video stream from server 302 for respective participants for the meeting. The video stream is captured from a camera on a device of another participant to the video conference. Network interface 1308 also receives data specifying a three-dimensional virtual space and any models therein from server 302. For each of the other participants, network interface 1308 receives a position and direction in the three-dimensional virtual space. The position and direction are input by each of the respective other participants.

Network interface 1308 also transmits data to server 302. It transmits the position of device 306A's user's virtual camera used by renderer 1318 and it transmits video and audio streams from camera 1304 and microphone 1302.

Display 1310 is an output device for presentation of electronic information in visual or tactile form (the latter used for example in tactile electronic displays for blind people). Display 1310 could be a television set, computer monitor, head-mounted display, heads-up displays, output of an augmented reality or virtual reality headset, broadcast reference monitor, medical monitors mobile displays (for mobile devices), Smartphone displays (for smartphones). To present the information, display 1310 may include an electroluminescent (ELD) display, liquid crystal display (LCD), light-emitting diode (LED) backlit LCD, thin-film transistor (TFT) LCD, light-emitting diode (LED) display, OLED display, AMOLED display, plasma (PDP) display, quantum dot (QLED) display.

Input device 1312 is a piece of equipment used to provide data and control signals to an information processing system such as a computer or information appliance. Input device 1312 allows a user to input a new desired position of a virtual camera used by renderer 1318, thereby enabling navigation in the three-dimensional environment. Examples of input devices include keyboards, mouse, scanners, joysticks, and touchscreens.

Web browser 308A and web application 310A were described above with respect to FIG. 3. Web application 310A includes screen capturer 1314, texture mapper 1316, renderer 1318, and audio processor 1320.

Screen capturer 1314 captures a presentation stream, in particular a screen share. Screen capturer 1314 may interact with an API made available by web browser 308A. By calling a function available from the API, screen capturer 1314 may cause web browser 308A to ask the user which window or screen the user would like to share. Based on the answer to that query, web browser 308A may return a video stream corresponding to the screen share to screen capturer 1314, which passes it on to network interface 1308 for transmission to server 302 and ultimately to other participants' devices.

Texture mapper 1316 texture maps the video stream onto a three-dimensional model corresponding to an avatar. Texture mapper 1316 may texture map respective frames from the video to the avatar. In addition, texture mapper 1316 may texture map a presentation stream to a three-dimensional model of a presentation screen.

Renderer 1318 renders, from a perspective of a virtual camera of the user of device 306A, for output to display 1310 the three-dimensional virtual space including the texture-mapped three-dimensional models of the avatars for respective participants located at the received, corresponding position and oriented at the direction. Renderer 1318 also renders any other three-dimensional models including, for example, the presentation screen.

Audio processor 1320 adjusts volume of the received audio stream to determine a left audio stream and a right audio stream to provide a sense of where the second position is in the three-dimensional virtual space relative to the first position. In one embodiment, audio processor 1320 adjusts the volume based on a distance between the second position to the first position. In another embodiment, audio processor 1320 adjusts the volume based on a direction of the second position to the first position. In yet another embodiment, audio processor 1320 adjusts the volume based on a direction of the second position relative to the first position on a horizontal plane within the three-dimensional virtual space. In yet another embodiment, audio processor 1320 adjusts the volume based on a direction where the virtual camera is facing in the three-dimensional virtual space such that the left audio stream tends to have a higher volume when the avatar is located to the left of the virtual camera and the right audio stream tends to have a higher volume when the avatar is located to the right of the virtual camera. Finally, in yet another embodiment, audio processor 1320 adjusts the volume based on an angle between the direction where the virtual camera is facing and a direction where the avatar is facing such that the angle being more normal to where the avatar is facing tends to have a greater difference in volume between the left and right audio streams.

Audio processor 1320 can also adjust an audio stream's volume based on the area where the speaker is located relative to an area where the virtual camera is located. In this embodiment, the three-dimensional virtual space is segmented into a plurality of areas. These areas may be hierarchical. When the speaker and virtual camera are located in different areas, a wall transmission factor may be applied to attenuate the speaking audio stream's volume.

Audio processor 1320 can also determine whether other users in the three-dimensional space are able to hear a user of device 306A based on a respective sound volume at which each of the other users are able to hear the user. For each of the other users, audio processor 1320 can determine the sound volume based on a respective position of the user's avatar relative, in the three-dimensional virtual space, to a position of the user's virtual camera in the three-dimensional virtual space. Audio processor 1320 can determine whether the users are able to hear the user based on the sound volume of the respective user exceeding a threshold amount. Audio processor 1320 can generate a list of users including the users that are able to hear the user in the three-dimensional virtual space. Audio processor 1320 can prevent transmission of the user's audio stream to the devices of the users that are not able to hear the user in the three-dimensional virtual space based on the list of users. Audio processor 1320 can transmit the user's audio stream to the devices of the users that are able to hear the user in the three-dimensional virtual space based on the list of users.

Renderer 1318 can render a notification for the user of device 306A indicating the users that are able to hear the user based on the audio processor 1320 determining which users are able to hear the user in the three-dimensional virtual space. The notification can include identifying information of the users and a total count of the users that are able to hear the user in the three-dimensional virtual space. Renderer 1318 can continuously update the notification for the user based on the audio processor 1320 determining additional or fewer users that are able to hear the user. For example, renderer 1318 can add identifying information about new users that are determined to be able to hear the user. Renderer 1318 can remove identifying information about users that are determined not to be able to hear the user. Renderer 1318 can also update the total count.

Server 302 includes an attendance notifier 1322, a stream adjuster 1324, and a stream forwarder 1326.

Attendance notifier 1322 notifies conference participants when participants join and leave the meeting. When a new participant joins the meeting, attendance notifier 1322 sends a message to the devices of the other participants to the conference indicating that a new participant has joined. Attendance notifier 1322 signals stream forwarder 1326 to start forwarding video, audio, and position/direction information to the other participants.

Stream adjuster 1324 receives a video stream captured from a camera on a device of a first user. Stream adjuster 1324 determines an available bandwidth to transmit data for the virtual conference to user 438B-1. It determines a distance between a first user and a second user in a virtual conference space. And, it apportions the available bandwidth between the first video stream and the second video stream based on the relative distance. In this way, stream adjuster 1324 prioritizes video streams of closer users over video streams from farther ones. Additionally, or alternatively, stream adjuster 1324 may be located on device 306A, perhaps as part of conference application 310A.

Stream forwarder 1326 broadcasts position/direction information, video, audio, and screen share screens received (with adjustments made by stream adjuster 1324). Stream forwarder 1326 may send information to the device 306A in response to a request from conference application 310A. Conference application 310A may send that request in response to the notification from attendance notifier 1322.

Stream forwarder 1326 can also determine whether other users in the three-dimensional space are able to hear a user of device 306A based on a respective sound volume at which each of the other users are able to hear the user. For each of the other users, stream forwarder 1326 can determine the sound volume based on a respective position of the user's avatar relative, in the three-dimensional virtual space, to a position of the user's virtual camera in the three-dimensional virtual space. Stream forwarder 1326 can determine whether the users are able to hear the user based on the sound volume of the respective user exceeding a threshold amount. Stream forwarder 1326 can generate a list of users including the users that are able to hear the user in the three-dimensional virtual space. Stream forwarder 1326 can prevent transmission of the user's audio stream to the devices of the users that are not able to hear the user in the three-dimensional virtual space based on the list of users. Stream forwarder 1326 can transmit the user's audio stream to the devices of the users that are able to hear the user in the three-dimensional virtual space based on the list of users.

Attendance notifier 1322 can render a notification for the user of device 306A indicating the users that are able to hear the user based on the stream forwarder 1326 determining which users are able to hear the user in the three-dimensional virtual space. The notification can include identifying information of the users and a total count of the users that are able to hear the user in the three-dimensional virtual space. Attendance notifier 1322 can continuously update the notification for the user based on the stream forwarder 1326 determining additional or fewer users that are able to hear the user. For example, attendance notifier 1322 can add identifying information about new users that are determined to be able to hear the user. Attendance notifier 1322 can remove identifying information about users that are determined not to be able to hear the user. Attendance notifier 1322 can also update the total count.

Network interface 1328 is a software or hardware interface between two pieces of equipment or protocol layers in a computer network. Network interface 1328 transmits the model information to devices of the various participants. Network interface 1328 receives video, audio, and screen share screens from the various participants.

Screen capturer 1314, texture mapper 1316, renderer 1318, audio processor 1320, attendance notifier 1322, a stream adjuster 1324, and a stream forwarder 1326 can each be implemented in hardware, software, firmware, or any combination thereof.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such as specific embodiments, without undue experimentation, and without departing from the general concept of the present invention. Therefore, such adaptations and modifications are intended to be within the meaning and range of equivalents of the disclosed embodiments based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing awareness of who can hear audio in a virtual conference, comprising:

(a) from a perspective of a virtual camera of a speaking user, rendering for display to the speaking user a three-dimensional virtual space including a plurality of avatars, wherein each user of a plurality of users is represented by a respective avatar of the plurality of avatars;

for each user of the plurality of users:

(b) determining a sound volume based on a position in the three-dimensional virtual space of the respective avatar relative to a position of the virtual camera in the three-dimensional virtual space;

(c) determining whether a user is able to audibly hear the speaking user based on whether the sound volume exceeds a threshold amount, wherein the sound volume can be higher or lower than the threshold amount; and (d) outputting a single visual notification comprising a username identifying each user of a list of users for display to the speaking user, wherein the single visual notification of the list of users excludes users from the plurality of users that are unable to audibly hear the speaking user.

2. The computer-implemented method of claim 1, wherein the single visual notification includes a total count of the list of users determined in (c) that are able to audibly hear the speaking user.

3. The computer-implemented method of claim 1, further comprising:

(e) receiving position and direction information of at least one user of the plurality of users in the three-dimensional virtual space;

(f) receiving a video stream captured from a camera of a device of the at least one user, the camera positioned to capture photographic images of the at least one user;

(g) texture mapping the video stream onto a three-dimensional model of an avatar of the at least one user; and (h) rendering, from the perspective of the virtual camera of the speaking user, for display to the speaking user, the three-dimensional virtual space including the texture-mapped three-dimensional model of the avatar located at a position and oriented at a direction based on the position and direction information of the at least one user.

4. The computer-implemented method of claim 1, wherein an application downloaded on a web-browser renders the three-dimensional virtual space in (a).

5. The computer-implemented method of claim 1, wherein the three-dimensional virtual space is segmented into a plurality of areas and each area in the plurality of areas comprises a wall transmission factor and a distance transmission factor.

6. The computer-implemented method of claim 5, wherein the determining of the sound volume in (b) is based on one or more of:

i) a distance between the virtual camera and the respective avatar, and the wall transmission factor of all areas between the virtual camera and the respective avatar; or ii) the distance transmission factor of all areas between the virtual camera and the respective avatar.

7. The computer-implemented method of claim 1, further comprising:

(e) determining whether a new user is able to audibly hear the speaking user based on a new sound volume for the new user exceeding the threshold amount; and (f) adding information about the new user in the visual notification.

8. The computer-implemented method of claim 1, further comprising:

(e) determining that at least one sound volume associated with at least one user in the plurality of users has dropped lower than the threshold amount; and (f) updating information about the at least one user from the visual notification.

9. A non-transitory, tangible computer-readable device having instructions stored thereon that, when executed by at least one computing device, causes the at least one computing device to perform operations for providing awareness of who can hear audio in a virtual conference, comprising:

(a) from a perspective of a virtual camera of a speaking user, rendering for display to the speaking user a three-dimensional virtual space, including a plurality of avatars, wherein each user of a plurality of users is represented by a respective avatar of the plurality of avatars;

for each user of the plurality of users:

(b) determining a sound volume based on a position in the three-dimensional virtual space of the respective avatar relative to a position of the virtual camera in the three-dimensional virtual space;

(c) determining whether a user is able to audibly hear the speaking user based on whether the sound volume exceeds a threshold amount, wherein the sound volume can be higher or lower than the threshold amount; and (d) outputting a single visual notification comprising a username identifying each user of a list of users for display to the speaking user, wherein the single visual notification of the list of users excludes users from the plurality of users that are unable to audibly hear the speaking user.

10. The non-transitory, tangible computer-readable device of claim 9, wherein the single visual notification includes a total count of the list of users determined in (c) that are able to audibly hear the speaking user.

11. The non-transitory, tangible computer-readable device of claim 9, wherein the operations further comprise:

(e) receiving position and direction information of at least one user of the plurality of users in the three-dimensional virtual space;

(f) receiving a video stream captured from a camera of a device of the at least one user, the camera positioned to capture photographic images of the at least one user;

(g) texture mapping the video stream onto a three-dimensional model of an avatar of the at least one user; and (h) rendering, from the perspective of the virtual camera of the speaking user, for display to the speaking user, the three-dimensional virtual space including the texture-mapped three-dimensional model of the avatar located at a position and oriented at a direction based on the position and direction information of the at least one user.

12. The non-transitory, tangible computer-readable device of claim 9, wherein an application downloaded on a web-browser renders the three-dimensional virtual space in (a).

13. The non-transitory, tangible computer-readable device of claim 9, wherein the three-dimensional virtual space is segmented into a plurality of areas and each area in the plurality of areas comprises a wall transmission factor and a distance transmission factor.

14. The non-transitory, tangible computer-readable device of claim 13, wherein the determining of the sound volume in (b) is based on one or more of:

i) a distance between the virtual camera and the respective avatar, and the wall transmission factor of all areas between the virtual camera and the respective avatar; or ii) the distance transmission factor of all areas between the virtual camera and the respective avatar.

15. The non-transitory, tangible computer-readable device of claim 9, wherein the operations further comprise:

(e) determining whether a new user is able to audibly hear the speaking user based on a new sound volume for the new user exceeding the threshold amount; and (f) adding information about the new user in the visual notification.

16. The non-transitory, tangible computer-readable device of claim 9, wherein the operations further comprise:

(e) determining that at least one sound volume associated with at least one user in the plurality of users has dropped lower than the threshold amount; and (f) updating information about the at least one user from the single visual notification.

17. A system for providing awareness of who can hear audio in a virtual conference, the system comprising:

a memory; and a processor coupled to the memory, the processor configured to:

(a) from a perspective of a virtual camera of a speaking user, render for display to the speaking user a three-dimensional virtual space, including a plurality of avatars, wherein each user of a plurality of users is represented by a respective avatar of the plurality of avatars;

for each user of the plurality of users:

(b) determine a sound volume based on a position in the three-dimensional virtual space of the respective avatar relative to a position of the virtual camera in the three-dimensional virtual space;

(c) determine whether a user is able to audibly hear the speaking user based on whether the respective sound volume exceeds a threshold amount, wherein the sound volume can be higher or lower than the threshold amount; and (d) output a single visual notification comprising a username identifying each user of a list of users for display to the speaking user, wherein the single visual notification of the list of users excludes users from the plurality of users that are unable to audibly hear the speaking user.

18. The system of claim 17, wherein the processor is further configured to:

(e) receive position and direction information of at least one user of the plurality of users in the three-dimensional virtual space;

(f) receive a video stream captured from a camera of a device of the at least one user, the camera positioned to capture photographic images of the at least one user;

(g) texture map the video stream onto a three-dimensional model of an avatar of the at least one user; and (h) render, from the perspective of the virtual camera of the speaking user, for display to the speaking user, the three-dimensional virtual space including the texture-mapped three-dimensional model of the avatar located at a position and oriented at a direction based on the position and direction information of the at least one user.

19. The system of claim 17, wherein an application downloaded on a web-browser renders the three-dimensional virtual space in (a).

20. The system of claim 17, wherein the three-dimensional virtual space is segmented into a plurality of areas and each area in the plurality of areas has a wall transmission factor and a distance transmission factor, and wherein the determining of the sound volume in (b) is based on one or more of:

i) a distance between the virtual camera and the respective avatar, and the wall transmission factor of all areas between the virtual camera and the respective avatar; or ii) the distance transmission factor of all areas between the virtual camera and the respective avatar.

* * * * *